(12) United States Patent
Viswanath et al.

(10) Patent No.: US 7,412,497 B2
(45) Date of Patent: Aug. 12, 2008

(54) GENERATION OF ADMINISTRATION FRAMEWORK FOR SERVER SYSTEMS

(75) Inventors: Sridatta Viswanath, Santa Clara, CA (US); Jeetendra Kaul, Sunnyvale, CA (US); Akm N. Islam, San Jose, CA (US); Ludovic J. Champenois, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1112 days.

(21) Appl. No.: 10/205,058

(22) Filed: Jul. 25, 2002

(65) Prior Publication Data

US 2004/0019663 A1  Jan. 29, 2004

(51) Int. Cl.
  *G06F 15/177* (2006.01)
  *G06F 15/173* (2006.01)
  *G06F 3/00* (2006.01)
(52) U.S. Cl. .................. 709/220; 709/223; 719/328
(58) Field of Classification Search .......... 709/220, 709/223; 718/1; 719/315, 328
  See application file for complete search history.

(56) References Cited

U.S. PATENT DOCUMENTS

| | | | | |
|---|---|---|---|---|
| 6,061,692 | A * | 5/2000 | Thomas et al. ........... | 707/200 |
| 6,230,160 | B1 | 5/2001 | Chan et al. | |
| 6,757,778 | B1 * | 6/2004 | van Rietschote ........... | 711/6 |
| 6,854,122 | B1 | 2/2005 | Sheriff et al. | |
| 6,934,952 | B2 | 8/2005 | Sarkar et al. | |
| 2002/0116437 | A1 | 8/2002 | Kambara et al. | |
| 2002/0147856 | A1 | 10/2002 | Sarkar et al. | |
| 2003/0217170 | A1 | 11/2003 | Nelson et al. | |
| 2004/0019662 | A1 | 1/2004 | Viswanath et al. | |
| 2004/0019669 | A1 | 1/2004 | Viswanath et al. | |
| 2004/0019670 | A1 | 1/2004 | Viswanath | |

OTHER PUBLICATIONS

Loeser et al., "iWebDB—Web Site Administration based on Object-Relational Database Technology," 1999 International Database Engineering and Application Symposium, 1999, (6 Pages).

(Continued)

*Primary Examiner*—Jason Cardone
*Assistant Examiner*—Tanim Hossain
(74) *Attorney, Agent, or Firm*—Robert C. Kowert; Meyertons, Hood, Kivlin, Kowert & Goetzel, P.C.

(57) ABSTRACT

A generator mechanism for generating an administration framework for server systems. In one embodiment, the administration framework may be generated from meta-information that describes elements of configuration data and relationships among the elements. The mechanism may provide automatic generation of the administration framework. In one embodiment, the administration framework may be a stack on an administration server that includes several layers each including one or more generated components. In one embodiment, the generation mechanism may generate management beans of a management layer, representing business logic of the server; configuration beans of a data representation layer; and a presentation layer for accessing and administering generated components. The data representation layer may provide transparency to the persistent store for the other layers. A production generation of the administration framework may be performed and instances of generated components may be deployed on other servers.

64 Claims, 14 Drawing Sheets

OTHER PUBLICATIONS

Dinesh C. Verma, "Simplifying Network Administration Using Policy Based Management," Network, IEEE, vol. 16, Issue: 2, ISSN:0890-8044, Mar./Apr. 2002 (8 Pages).

Seshadri Gokul, "J2EE Components and Services," http://www.samspublishing.com/articles, May 24, 2002, (6 Pages).

"J2EE," http://searchwebservices.techtarget.com/gDefinition/0,294236,sid26_gci283984,00.html,3Mar. 28, 1984, (3 Pages).

Hunt et al., "Distributed Configuration Management via Java and the World Wide Web," University of Karlsruhe, Karlsruhe, Germany, May 1997, (14 Pages).

Watson et al., "DHCP Server Verification by Client Via DNSSEC," http://mirrors.isc.org/pub/www.waterspirngs.org/pub/id/draft-watson-dhc-serv-verify-00.txt, Jul. 30, 1997, (6 Pages).

\* cited by examiner

GENERATION OF ADMINISTRATION FRAMEWORK FOR SERVER SYSTEMS

BACKGROUND OF THE INVENTION

1. Field of the Invention

This invention relates to computer networks, and more particularly to a dynamic administration framework for distributed server systems.

2. Description of the Related Art

An application server is a server program in a computer in a distributed network that provides the business logic for an application program. The application server is frequently viewed as part of a three-tier application, consisting of a graphical user interface (GUI) server, an application (business logic) server, and a database server. More descriptively, it can be viewed as dividing an application into:

- A first-tier, front-end, Web browser-based graphical user interface, usually at a personal computer or workstation;
- A middle-tier business logic application or set of applications, possibly on a local area network or intranet server;
- A third-tier, back-end, database and transaction server, sometimes on a mainframe or large server.

Older, legacy application databases and transaction management applications are part of the back end or third tier. The application server is the middleman between browser-based front-ends and back-end databases and legacy systems.

A Web server is a program that, using the client/server model and the World Wide Web's Hypertext Transfer Protocol (HTTP), serves the files that form Web pages to Web users (whose computers contain HTTP clients that forward their requests). Every computer on the Internet that contains a Web site must have a Web server program.

In servers based on the J2EE (Java 2 Platform, Enterprise Edition) distributed computing model, the business presentation is typically represented using servlets and/or Java Server Pages (JSPs), and the business logic typically runs in the form of distributed components such as Enterprise JavaBeans (EJBs).

J2EE (Java 2 Platform, Enterprise Edition) is a Java platform designed for the mainframe-scale computing typical of large enterprises. Sun Microsystems (together with industry partners such as IBM) designed J2EE to simplify application development in a thin client tiered environment. J2EE simplifies application development and decreases the need for programming and programmer training by creating standardized, reusable modular components and by enabling the tier to handle many aspects of programming automatically. J2EE includes a number of components, including:

- The Java Development Kit (JDK) is included as the core language package.
- Full support for Enterprise JavaBeans. EJB is a server-based technology for the delivery of program components in an enterprise environment. It supports the eXtensible Markup Language (XML) and has enhanced deployment and security features.
- The Java servlet API (application programming interface) enhances consistency for developers without requiring a graphical user interface (GUI).
- Java Server Pages (JSP) is used for dynamic Web-enabled data access and manipulation.

The J2EE Application Programming Model is the standard programming model used to facilitate the development of multi-tier, thin client applications. The J2EE Platform includes policies and APIs such as the Java servlets and Java Message Service (JMS).

The Sun™ One Application Server provides a robust J2EE e-commerce platform for the development, deployment, and management of application services to a broad range of servers, clients, and devices. The Sun™ One Application Server maximizes application re-use and developer collaboration and demonstrates the potential of leveraging Java for large-scale web and wireless applications.

The Sun™ One Web Server is a software product for developers engaged in building dynamic Web applications for e-commerce sites. Multiplatform support makes it possible for developers to work in the operating system environment of their choice. The product works with Java™ Servlet and JavaServer Pages™ technologies to generate personalized content and speed development. Its centralized server management, content management, and rapid application development features combine to deliver a powerful means for enterprises to move their businesses to the Internet.

Java™ Management Extensions (JMX) is an open technology for management and monitoring for deployment across industries wherever management and/or monitoring may be needed or desired. JMX may be used, for example, for adapting legacy systems, implementing new management and monitoring solutions and plugging into future solutions. JMX may provide tools for building distributed, Web-based, modular and dynamic solutions for managing and monitoring devices, applications and service-driven networks.

A bean may be defined as a component, a reusable program building block that may be combined with other components in the same or other computers in a distributed network to form an application. Examples of components include, but are not limited to, buttons in a graphical user interface and interfaces to a database manager. Components may be deployed on different servers in a network and may communicate with each other for needed services. A component may run within a context called a container. Examples of containers include, but are not limited to, pages on a Web site, Web browsers, and word processors.

A managed bean, or MBean, is a Java object that represents a JMX manageable resource. MBeans may follow the Java-Beans™ components model, thus providing a direct mapping between JavaBeans components and manageability. Because MBeans provide instrumentation of managed resources in a standardized way, they can be plugged into any JMX agent.

The open source schema2beans library (schema2beans jar file) allows the generation of a set of java bean classes from a DTD or XML Schema file. This set of beans may be used to represent an XML file as a graph of java beans. Elements of the graph may be added, changed and/or removed, graphs may be merged and compared, and events may be generated and obtained on any change in the graph. The graph may be written back as a DTD or XML Schema file. The package of this library is includes a schema2beans runtime and schema2beans generator, both part of the same schema2beans jar file.

XPath is a language that describes a way to locate and process items in documents (e.g. Extensible Markup Language (XML) documents) by using an addressing syntax based on a path through the document's logical structure or hierarchy. This makes writing programming expressions easier than if each expression had to understand typical XML markup and its sequence in a document. XPath also allows the programmer to deal with the document at a higher level of abstraction. XPath is a language that is used by and specified as part of both the Extensible Stylesheet Language Transformations (XSLT) and by XPointer (SML Pointer Language). It uses the information abstraction defined in the XML Information Set (Infoset). Since XPath does not use XML syntax itself, it may be used in contexts other than those of XML.

SUMMARY OF THE INVENTION

A generator mechanism that may be used to generate an administration framework for server systems such as application and web server systems is described. In one embodiment, the administration framework may be generated from meta-information that describes elements or properties of configuration data, and that may describe relationships (e.g. hierarchical relationships) among the elements of the configuration data. During development, configuration data, and thus the meta-information describing the configuration data, may be changed. The generation mechanism may provide an automatic way to generate the administration framework rather than having to manually make changes to the administration framework to support changes in configuration data. In one embodiment, XML may be used as a data representation language for the meta-information.

The meta-information may include a representation of the elements and element attributes of a persistent store of configuration information. The meta-information may be represented in formats including, but not limited to, markup languages such as XML, schemas, DTDs, etc. In one embodiment, all meta-information may be contained in one file (e.g. an XML file or a schema file). In one embodiment, the meta-information file may be generated by a user or users, for example a server system designer or developer, to describe the elements of configuration data of the server system and the relationships among the described elements. In one embodiment, the meta-information may be accessed by administration framework generator(s) to generate components of the administration server to be used at runtime for monitoring and managing the system.

In one embodiment, the administration framework may be a stack implemented on an administration server that includes several layers each including one or more components. At least a portion of each of these layers may be generated by the generation mechanism from the meta-information. In one embodiment, the generation mechanism may generate one or more management beans (e.g. MBeans) of a management layer, each representing business logic of the server. In one embodiment, the generation mechanism may generate one or more configuration beans of a data representation layer. In one embodiment, the generation mechanism may generate one or more components of a presentation layer (e.g. an administration user interface (UI)) for use in displaying, locating, accessing, managing and modifying configuration elements and/or attributes as represented in the configuration beans.

At runtime, the generated administration UI of the presentation layer may be used to access the management layer (e.g. management beans) to perform administration, monitoring and configuration operations. The management layer may access the data representation layer (e.g. configuration beans) to access the server configuration information. The data representation layer may abstract the other layers from the persistent store, and thus may provide data storage format and location transparency to the persistent store for the other layers.

In one embodiment, when the system is ready to go from development to a production environment, a production generation of the administration framework may be performed and the system may be deployed. In one embodiment, deployment may include implementing instances of components generated on the administration server (e.g. the configuration beans representing the configuration information and the management beans implementing the business logic) on one or more other servers (e.g. application servers) to which the server system is to be deployed. The server components may then access the management beans and the in-memory representation of the configuration information (e.g. the configuration beans) to perform server tasks.

Figure 1A:
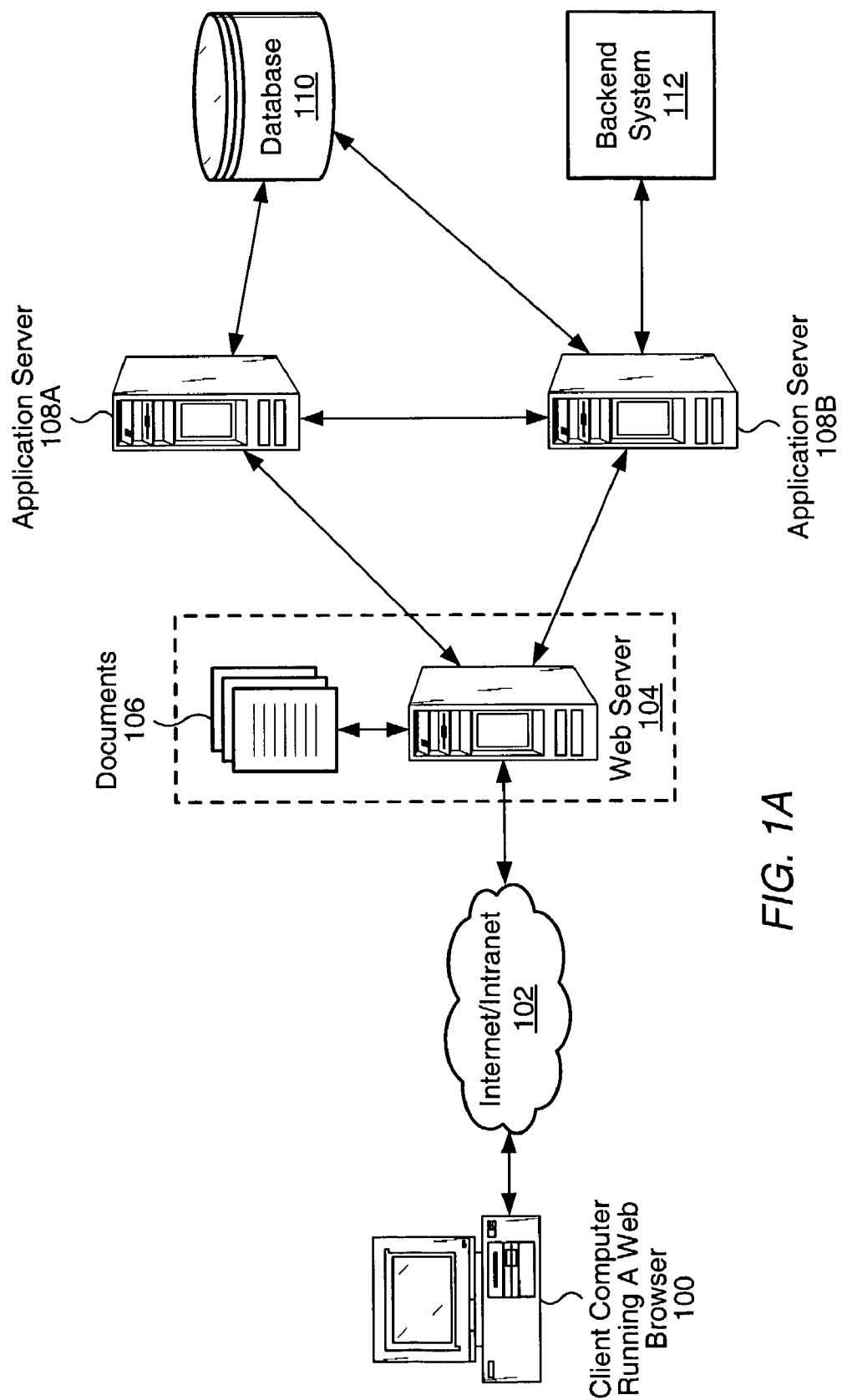
FIG. 1A illustrates an exemplary architecture for a web application that utilizes an application server cluster.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a dynamic administration framework for server systems such as application and web server systems are described. Embodiments may address the generation as well as the runtime behavior of the administration framework and one or more of its components. Given meta-information that describes a system, a generation mechanism may generate one or more of the components of the administration framework for administration of that system. In one embodiment, the generated components may include components that are implemented as Java beans. In one embodiment, at least a portion of the generated components may include, but are not limited to, one or more of program (e.g. business) logic for the server(s) and access functions for accessing configuration information of the server system. In one embodiment, the administration framework may include an administration user interface (UI) that may be generated from the meta-information and that may be used to manage and monitor components of the generated administration framework.

In one embodiment, generated components of the administration framework may include an in-memory representation of configuration information for the server system. In one embodiment, the in-memory representation of configuration information may include a plurality of components (e.g. beans) generated from the meta-information. In one embodiment, each of the plurality of components included in the in-memory representation of configuration information may represent an element of the configuration information; each of these components may be located and accessed to access the corresponding configuration element.

"In-memory" is used herein to distinguish representations of the configuration information on the server(s) in a server system from the backend storage of the configuration information. The in-memory representation of the configuration information may be used, for example, during development of the server system and/or during runtime of the server system. The in-memory representation may be stored in various memory media of a server including one or more of, or a combination of, RAM (e.g. SDRAM, DDR SDRAM, RDRAM, SRAM, etc.), ROM, and local storage devices such as disks. For example, in a system supporting virtual memory, a portion of the in-memory representation may be stored in active storage (e.g. RAM) and other portions may be stored in or "swapped out" to hard disk or other high volume storage devices.

During development, configuration data, and thus the meta-information describing the configuration data, may be changed. The generation mechanism as described herein may provide an automatic way to generate the administration framework rather than having to manually make changes to the administration framework to support changes in configuration data. If an element or attribute changes, the generation mechanism may provide an automatic method to update the administration framework rather than having to locate and make changes to every instance of the element or attribute manually.

Embodiments of the administration framework may provide storage transparency to the backend storage of configuration data. Backend storage of configuration information for a system (which may be referred to as a persistent store) may be distributed across one or more data storage devices, and may be formatted in accordance with one of a variety of heterogeneous data storage formats (e.g. file-based, LDAP, etc.). The data storage format and/or distribution of the persistent store may be changed, for example to meet changing requirements of the system. Through storage transparency, frontend clients may access the persistent store of configuration data independent of the distribution and/or data storage format of the persistent store. In one embodiment, the administration framework may provide a generic application programming interface (API) that provides the storage transparency between the persistent store of configuration information and clients of the persistent store. The API (which may be referred to as a configuration API) may provide a unified view of the persistent store of configuration information, and may provide a generic interface for accessing heterogeneous data storage formats that may be used in the backend storage. Through the generic interface provided by the API, a frontend process or component may access multiple stores on different backend storage devices using a single operation (e.g. a write or a read operation).

One embodiment may include an event notification mechanism that may allow events (e.g. changes in configuration data) to be propagated in a distributed system running several virtual machines (VMs) (e.g. Java Virtual Machines (JVMs)).

One embodiment may provide a generic, pluggable, extensible verification and validation mechanism that may be reusable in stand-alone (off-line) applications and in applications server (on-line).

Figure 1B:
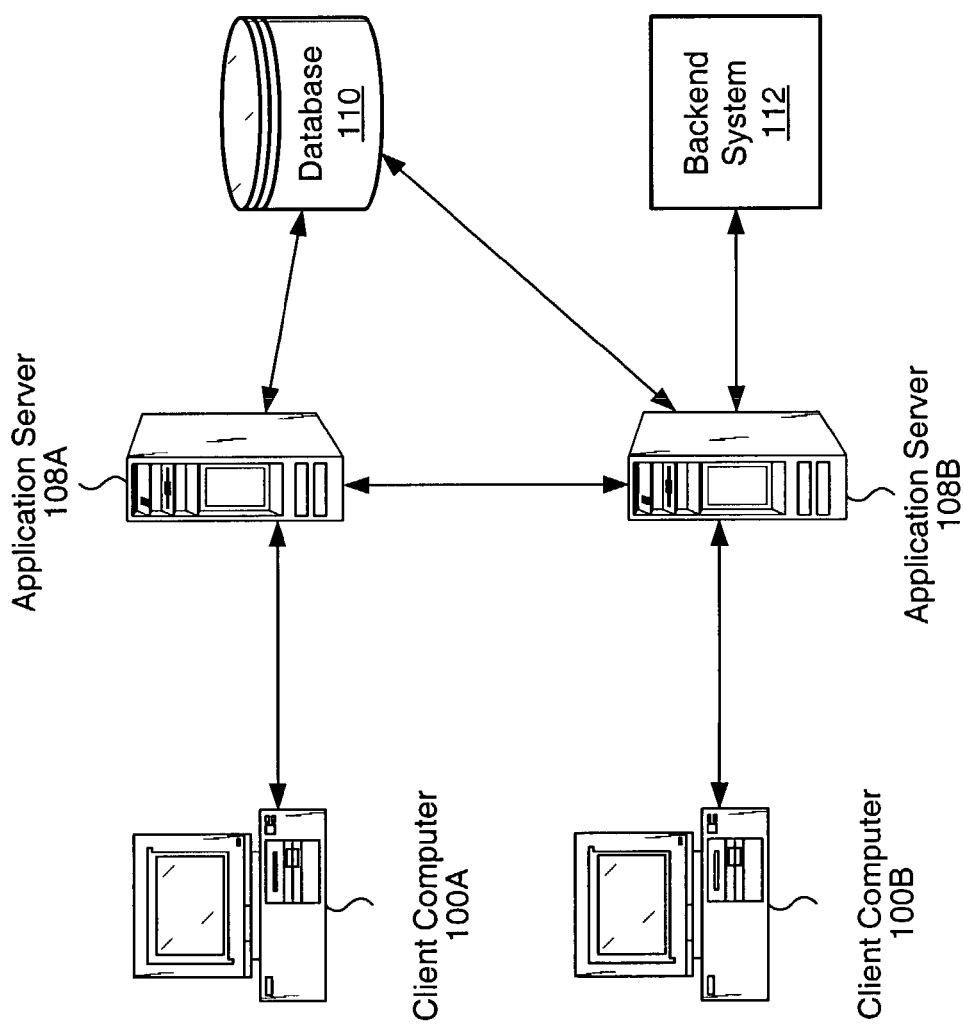
FIG. 1B illustrates an exemplary architecture for an application that utilizes an application server cluster.

FIGS. 1A and 1B illustrate exemplary architectures for client/server systems that utilize application server clusters. It is noted that application server clusters may be utilized in any of various types of systems, and FIGS. 1A and 1B illustrate only one exemplary use.

In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL.

FIG. 1A illustrates a client computer 100 running a web browser, such as the Netscape Navigator or Microsoft Internet Explorer web browsers. It is noted that the web browser need not be a web browser per se, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

As the web server 104 receives a request from a client computer 100, the web server may treat the request differently, depending on the type of resource the request references. For example, if the request references a document 106, such as an HTML document, then the web server may process the request itself, e.g., by retrieving the document from the web server's local file system or from a local cache and returning the document to the client computer. For other types of requests, e.g., requests referencing executable components, such as Java servlets, JavaBeans components, C program modules, CORBA components, etc., the web server 104 may broker the request to an application server 108. For example, as shown in FIG. 1A, there may be a plurality of application servers 108 in a cluster, and the web server 104 may select an application server to which to broker the request, e.g., using load balancing techniques. The web server 104 may interface with an application server 108 using various techniques, e.g., through an in-process extension, such as an ISAPI or NSAPI extension.

The application server 108 may be configured as a part of an application server cluster. Although FIG. 1A illustrates an application server cluster with only two application servers, it is noted that the cluster may comprise any number of application servers. Each application server 108 may interface with various types of other servers or systems. For example, as illustrated in FIG. 1A, the application servers 108 may communicate with a database 110. Each application server 108 in the cluster may interface with the same systems, or the application servers 108 may differ in which systems they interface with. For example, application server 108B is shown to interface with a backend system 112, e.g., a CICS, R/3, PeopleSoft, or other type of backend system. For example, the backend system 112 may be responsible for managing enterprise data or performing business functions for an enterprise.

Application servers 108 in a cluster may or may not be in close physical proximity to each other. The application server computers may be connected to each other in any of various ways. For example, in one embodiment, each application server computer may be a member of a single local area network (LAN). In another embodiment, various of the application server computers may be located in two or more LANs, wherein the LANs are networked together.

While FIG. 1A illustrates web server 104 and application servers 108 as implemented on different computing devices, it is noted that in various embodiments one or more web servers 104 and one or more application servers 108 may be implemented in software on a computing device. For example, web server 104 and application server 108B may be implemented on a single computing device. In some embodiments, one or more web servers 104 and/or one or more application servers 108 may be implemented on virtual machines (VMs) (e.g., Java Virtual Machines (JVMs)). The virtual machines may be implemented on one or more computing devices. For example, in FIG. 1A, web server 104 and application servers 108A and 108B may each be implemented in a separate virtual machine, or alternatively one or more of the servers may be implemented in a single virtual machine.

In alternative embodiments, as illustrated in FIG. 1B, a client computer 100 may communicate directly with an application server 108 or application server cluster, without interfacing through a web server. As one example, the application servers 108 may run an enterprise resource planning application, and the client computers 100 may be computers within the enterprise that are connected to the application servers 108 via a WAN. In this example, the client computers may run "thick client" software, e.g., client software that comprises a portion of the enterprise resource planning application logic. The client computer software may interface directly with executable programs or components running on the application servers, e.g., through a protocol such as the Internet Inter-Orb Protocol (IIOP).

As noted above, FIGS. 1A and 1B represent exemplary architectures only, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, other types of legacy systems, etc.

Figure 2:
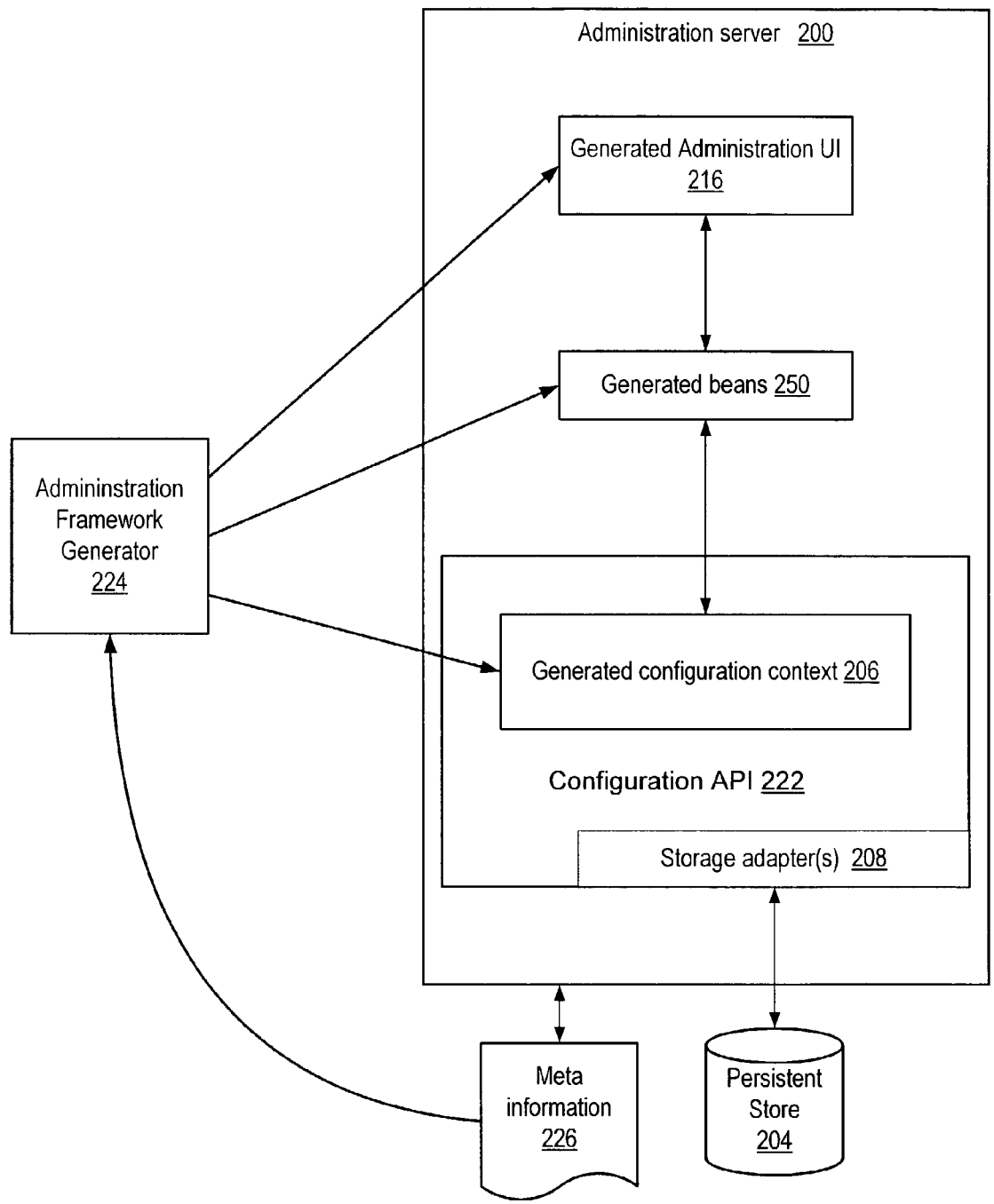
FIG. 2 illustrates an administration server implemented in accordance with a dynamic administration framework according to one embodiment.

FIG. 2 illustrates an administration server implemented in accordance with a dynamic administration framework according to one embodiment. FIG. 2 shows an administration server 200, a persistent store 204 and meta-information 226. FIG. 2 also illustrates flow of a process of generating the administration framework from meta-information 226 describing a persistent store 204 of configuration information of the administration server 200. One embodiment may include an administration framework generator 224 mechanism that may be used to generate an administration framework from meta-information 226 (e.g., an XML file, a schema, a DTD file, etc.) that includes descriptions of elements or properties, and their attributes, of the persistent store 204, and that may also describe relationships (e.g. hierarchical relationships) among the elements. The administration framework generator 224, along with the configuration API 222, may be used as a basis for administering a server system. The administration framework generator 224 mechanism may provide pluggability and ease of maintenance, among other advantages. While the administration framework generator 224 mechanism is illustrated as being separate from application server 200, it is noted that in one embodiment, the administration framework generator 224 mechanism may be included in the application server 200. In one embodiment, the administration framework generator 224 mechanism and the application server 200 may be software components of a computer system, or alternatively may be software components of different computer systems. In one embodiment, the administration framework generator 224 mechanism and the application server 200 may be software components of a virtual machine, or alternatively may be software components of different virtual machines.

In one embodiment, all elements or properties of the persistent store 204 may be represented in one or more meta-information 226 files (e.g. an XML file). In one embodiment, all elements or properties of the persistent store 204 may be represented in exactly one meta-information 226 file (e.g. an XML file). In one embodiment, there may be one such file per server instance in the server system. In one embodiment, XML may be used as a data representation language for the meta-information. The meta-information 226 may include rules defining the system configuration data. The meta-information may describe elements to be administered and their attributes. For example, an element called "server" may have attributes such as name, locale(s), log-root, etc. These attributes may have default values described in the meta-information 226, as well as a list of correct possible values, and in one embodiment may be described as REQUIRED or IMPLIED.

Meta-information 226 file may include representations of configuration information for the application server 200. In one embodiment, this configuration information may include server-level configuration information, e.g. information describing data of persistent store 204 and information describing deployed applications that servers associated with the administration server 200 may run. In one embodiment, meta-information 226 may not include application-level configuration data. In one embodiment, the meta-information 226 may be configuration information in any of different formats including, but not limited to, XML, LDAP, DTD, schema, database-based, and file-based.

In one embodiment, the meta-information 226 may include server and component configuration information as well as registered application information. In one embodiment, deployed applications may be stored, for example, as jar files, with application configuration info within the jar files (e.g. application.xml, etc). The following illustrates the structure of an exemplary meta-information 226 file that uses tags (e.g. an XML file), and is not intended to be limiting:

```
<Domain>
    <resources... />
    <Application>
    ...
    <WebAppComponent>
    ...
    <EJBComponent>
    ...
    </Application>
    <Application ... />
    <Server...>
    <web container>
    ...
    <etc...>
    </Server>
</Domain>
```

In one embodiment, there is a hierarchical relationship among the elements of the configuration data. In this embodiment, the elements and their hierarchical relationship are represented in meta-information 226.

In one embodiment, the meta-information 226 may be accessed by generator mechanism 224 to generate beans 250. Beans 250 may provide a bean representation of the configuration data of the backend persistent store 204. In one embodiment, beans 250 may be generated in a hierarchical relationship to represent a hierarchical relationship of configuration data elements as described in meta-information 226.

A bean 250 may include one or more methods for performing business logic of the server system that may perform operations on, or using, one or more elements of the persistent store 204. A bean may also include "get" and "set" methods for the attributes of the corresponding elements. These generated methods may implement the constraints on the data elements defined in the meta-information 226. Elements may have sub-elements that may be used to describe hierarchical data of the system. For example, an element "server" may have sub-elements "web-container," "resources," "applications," etc. Each of these sub-elements may also have sub-elements and attributes.

In one embodiment, the generator mechanism 224 may generate a bean 250 for each corresponding element in meta-information 226. Beans 259 may represent every element in the meta-information 226 file. For example, if there are five elements under the root, there will be five beans representing the elements. In one embodiment, a bean 250 may include other beans 250 and/or references to other beans 250. In one embodiment, elements have a one-to-one correspondence to generated beans 250.

In one embodiment, generator mechanism 224 to generate beans 250 using the open source schema2beans library. In one embodiment, beans 250 may be exposed so that the beans may be modified by users.

In one embodiment, the generator mechanism 224 may generate, from meta-information 226, one or more bean methods in a bean 250 to describe the containment relationship between elements. These methods may facilitate adding, removing, and replacing a sub-element, or accessing a sub-element give a primary key, for example. A primary key may be included in the meta-information for each element, and may include one or more of the attributes of the element. For example, the primary key for the "server" element may be its name, since servers may have different names. Other bean methods may also be generated, for example for getting the number of sub-elements of a certain type (e.g., the number of applications for the server).

In one embodiment, application server may include a configuration API 222 that may provide an interface to the persistent store 204 as represented in meta-information 226, and thus may abstract the persistent store 204 to provide flexibility of storage and location transparency. In one embodiment, the configuration API 222 may provide access to the meta-information 226 file (any element, any attribute). In one embodiment, configuration API 222 is a generic API. In one embodiment, the core configuration API is not generated by administration framework generator 224, and may be used "as is" in any of a variety of server applications to provide an interface to persistent stores 204 in any of a variety of formats. Generated beans and other components may use the configuration API as a generic, transparent access method to the backend storage of the persistent store 204, independent of the format of the backend storage.

The persistent store 204 of configuration information may be distributed across one or more data storage devices, and may be formatted in accordance with one of a variety of heterogeneous data storage formats (e.g. file-based, LDAP, etc.). The data storage format and/or distribution of the persistent store may be changed, for example to meet changing requirements of the system. Through storage transparency, frontend clients may access the persistent store of configuration data independent of the distribution and/or data storage format of the persistent store. The configuration API may provide a unified view of the persistent store of configuration information, and may provide a generic interface for accessing heterogeneous data storage formats that may be used in the backend storage. Through the configuration API, a frontend process or component may access multiple stores on different backend storage devices using a single operation (e.g. a write or a read operation).

In one embodiment, the configuration API 222 may provide storage transparency. The backend storage (persistent store 204) may be changed without requiring change to the generated front end provided by the administration framework. For example, if the backend storage format of the persistent store 204 is changed (e.g. from file-based to LDAP), the administration framework may not need to be regenerated. The context may be changed inside the configuration API 222 (for example, one or more different storage adapters 208 may be plugged in to support the new backend format), and the changed persistent store 204 may be accessed by the previously generated administration framework through the configuration API 222.

The configuration API 222 may provide a generic interface to manage (e.g. create, read, validate, write and/or delete) the system configuration information of persistent store 204 as represented in meta-information 226 and the generated beans 250. The administration framework, through the configuration API 222, may be independent of the technology used in the persistent store 204. The generated administration framework and its components may use the configuration API 222 to provide support for any type of persistent store 204. For example, the persistent store 204 may be an XML file, an object database, a relational database or any other type of file-based or database repository.

Clients of the configuration API 222 may do a lookup using the configuration API 222 to get an in-memory representation of the corresponding configuration data from persistent store 204. This data for may be, for example, a representation of a Java Properties file, an XML file or other file including configuration information. The configuration API's clients may include one or more of, but are not limited to, an administration server, a deployment backend, and the containers that comprise the server. The deployment backend may register applications and/or modules and then register the URLs of those applications and/or modules. The configuration API 222 supports the deployment backend by providing the ability to store these values in the meta-information file, enabling containers (e.g. EJB containers) and other entities to query for them.

The configuration API 222 may include one or more of, but is not limited to, configuration context 206 which may include beans 250, a factory for creating the beans, and a mechanism (e.g. XPath) to look up the beans, a notification mechanism, and a change management mechanism. For example, a lookup may be performed on an Xpath expression (e.g. /server/container) using XPath. The lookup may return a bean 250 that represents the ejbcontainer. APIs of beans 250 returned by a lookup may then be called.

Configuration API 222 functionality may include, but is limited to, one or more of, basic configuration operations (e.g. set and get elements and attributes APIs), event notification, cloning, bean lookup mechanism (e.g. XPath) support, change management (e.g. add, update, delete, set), read only operations, auto commit, advanced configuration (e.g. one API to access attributes), intelligent refresh, get DTD default values, DOM-like API support (e.g. appendChild, removeChild), finding APIs, serialization and deserialization. The configuration API 222 may provide support for distributed systems. In one embodiment, the configuration API 222 may provide hierarchical semantics into the configuration data. The configuration API 222 may be used to iterate through nodes and navigate to a desired attribute.

In one embodiment, the configuration API 222 may include configuration context 206. Configuration context 206 may provide an interface that includes APIs to read, persist, and access persistent store 204 data. Configuration context 206 may provide central in-memory abstraction of the configuration data. Configuration context 206 may provide an interface to perform accesses (e.g. reads and writes) to the persistent store 204. Configuration context 206 may be used by the "above" layers (e.g. management and data presentation layers) to access persistent store 204 data. Storage adapters 208 of configuration API 222 may be used (and switched) below the configuration to interface to the particular persistent store 204 format. The configuration context 206 may be used, for example by containers, to look up configuration data as desired. In one embodiment, configuration context 206 may be used to write to multiple storages on different machines with a single operation. In one embodiment, a configuration context 206 may be created for each server during server initialization.

In one embodiment, the generator mechanism 224 may generate one or more components (e.g. beans 250) of configuration context 206 using meta-information 226. In one embodiment, configuration context 206 may be included in configuration API 222. Configuration context 206 may include information that represents the meta-information 226. In one embodiment, at least some of generated beans 250 may be included as components of the configuration context 206, and may be used as accessible representations of the meta-information 226. Beans 250 in configuration context 206 may include "get" and "set" methods for the attributes of the corresponding elements. These beans 250 may also include one or more bean methods that describe the containment relationship between two elements. In one embodiment, configuration context 206 may include APIs to look up beans 250 of the configuration context 206. In this embodiment, beans 250 including business logic may reside outside of configuration context 206, and may use the lookup APIs to access the beans 250 of configuration context 206.

APIs may be provided to the configuration context 206 for functions including one or more of, but not limited to: reading from, refreshing, and writing to the persistent store 204; tracking and managing changes to the configuration context 206; looking up a bean or multiple beans (e.g. using XPath). APIs may also be provided for one or more factory classes for constructing and/or deleting configuration context 206 and/or components of configuration context 206.

A configuration context 206 represents a hierarchical view of the configuration attributes from persistent store 204 as represented in the meta-information file. The configuration context 206 may read the configuration attributes from the meta-information file. In one embodiment, a configuration factory may be provided to construct a configuration context 206. The configuration context 206 may have a one-to-one relationship with the meta-information file.

In one embodiment, the configuration context 206 may track configuration changes. In one embodiment, the configuration API 222 may keep track of and otherwise manage changes in the configuration context 206. One embodiment may provide mechanisms for obtaining or resetting the changes in the configuration context 206. In one embodiment, the configuration changes may be serialized and sent across to another configuration context (for example, in another VM) to be updated on the other configuration context 206. In one embodiment, a query language (e.g. XPath) may be used to track where to make the changes.

In one embodiment, the configuration API 222 may include one or more storage adaptors 208 that may support multiple accesses in read or write mode to the data of persistent store 204. The configuration API 222 may handle concurrent access and may manage and/or prevent conflicts. In one embodiment, the configuration API 222 may manage the number of instances of the configuration context 206 in the server system to prevent the configuration context 206 from overwriting changes in persistent store 204. In one embodiment, the configuration API 222 may detect stale data in the configuration context 206 due to changes in storage.

One embodiment may provide a change management mechanism. A configuration context 206 in one server (e.g., a virtual machine (VM) such as a Java Virtual Machine (JVM)) may be modified. The configuration API 222 may track the changes, and may serialize objects representing the changes and send them "across wire" to update other configuration contexts 206 with the information from these serialized objects. Thus, instead of saving changes to persistent store 204 and reading them back into another VM, configuration contexts 206 may be updated in memory without going to persistent store 204.

In one embodiment, the generator mechanism 224 may generate, from meta-information 226, an administration user interface (UI) 216 that provides support for users to administer the system. The administration UI 216 may be used, for example, for administration of the generated beans 250. In one embodiment, the generated administration UI 216 may include one or more servlets for driving the administration UI 216, and one or more JSPs for each page of the UI. These JSPs may be customized by users if desired.

Embodiments may be used in rapid development environments. In a development project, data representations may change as the project matures. The generation mechanism 224 as described herein may ease the manual development process and help in keeping the administrative code consistent with the data representation. The automation of change control provided by the generation mechanism 224 may enable a rapid, flexible development environment. Through the meta-information 226 file and the framework generator 224, users who desire to manage server configurations and the developers of the server configurations may not have to manually write management code. In one embodiment, when the product is ready to go from development to a production environment, a production generation of the administration framework may be performed and the system may be deployed.

In one embodiment, meta-information 226 file may be generated by users of the server system. In one embodiment, the users may represent the configuration information in the meta-information 226 in a desired format, and the framework generator 224 may generate one or more components of the administration framework. Once the administration framework is generated, the administration framework may be compiled with application server or system-specific components.

The compiled system may then be used at runtime. A user may access the generated administration UI 216, for example to edit a user property. The property may be changed using the UI. The administration UI 216 may then locate and access one or more beans 250 to access the user property. The one or more beans may then use the generic interface provided by the configuration API 222 to access and, if needed or desired, modify the property in persistent store 204.

Figure 3:
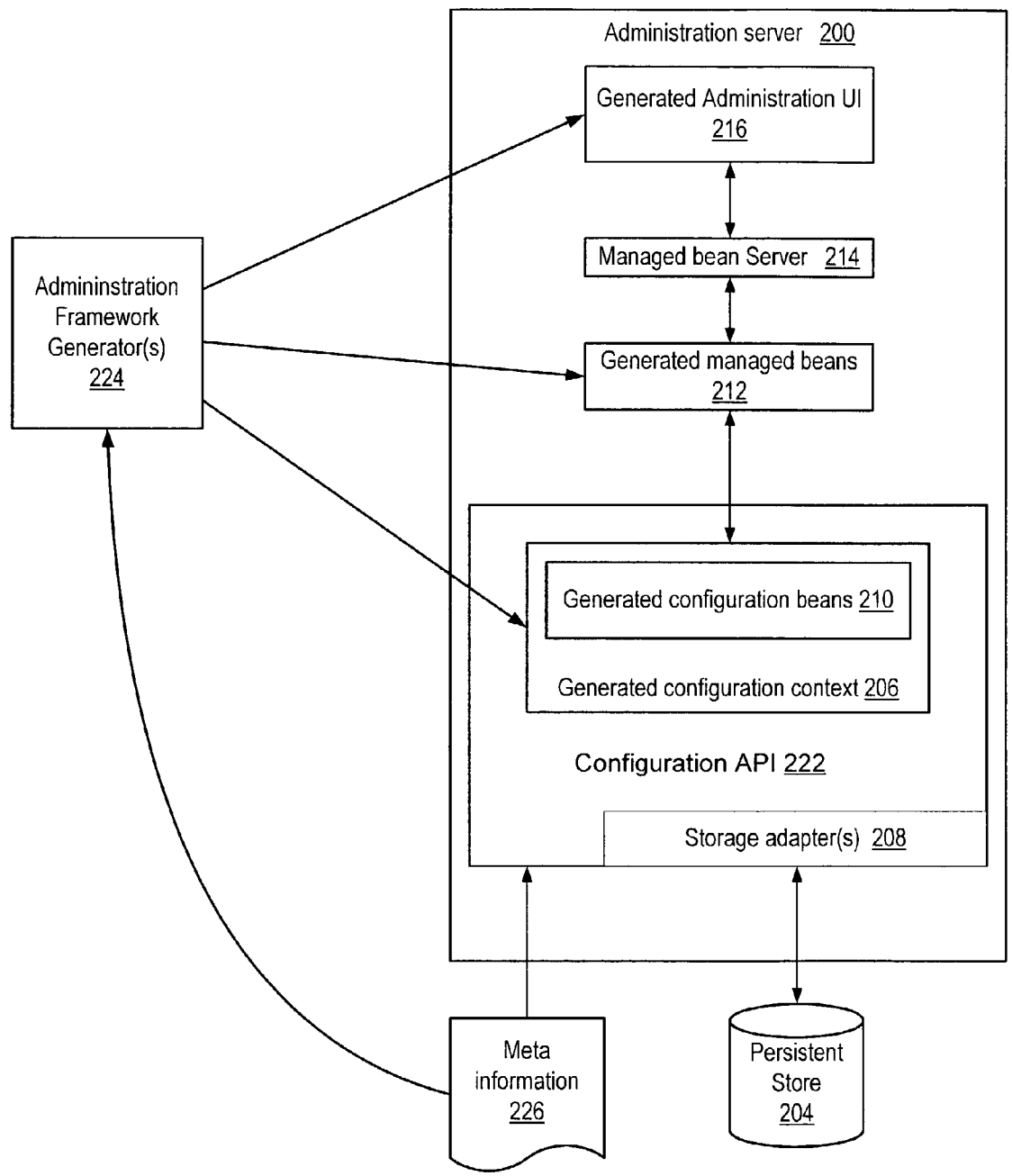
FIG. 3 illustrates an administration server with management beans and configuration beans implemented in accordance with a dynamic administration framework according to one embodiment.

FIG. 3 illustrates an administration server with management beans and configuration beans implemented in accordance with a dynamic administration framework according to one embodiment. In one embodiment, the administration framework may be a stack including several layers. In one embodiment, generated beans including business logic (hereinafter referred to as management beans 212) may be part of a management layer of the administration server 200, and the configuration API 222, configuration context 206 and its beans (hereinafter referred to as configuration beans 210) may be part of a data representation layer that represents data of persistent store 204 in memory. Administration UI 216 may be part of a data presentation layer of the administration server 200.

FIG. 3 also illustrates flow of a process of generating the administration framework from meta-information 226 describing a persistent store 204 of configuration information of the administration server 200. One embodiment may include an administration framework generator 224 mechanism that may be used to generate an administration framework from meta-information 226 (e.g., an XML file, a schema, a DTD file, etc.) that includes representations of all elements or properties, and their attributes, of the persistent store 204, and that may also describe relationships (e.g. hierarchical relationships) among the elements. The administration framework generator 224, along with the configuration API 222, may be used as a basis for administering a system.

In one embodiment, all elements or properties of the persistent store 204 may be represented in one meta-information 226 file (e.g. an XML file). The meta-information may describe elements to be administered and their attributes. The meta-information 226 may be used, for example, by the generator mechanism 224 to generate components including, but not limited to, one or more of configuration beans 210, management beans 212, and components of administration UI 216.

Figure 4:
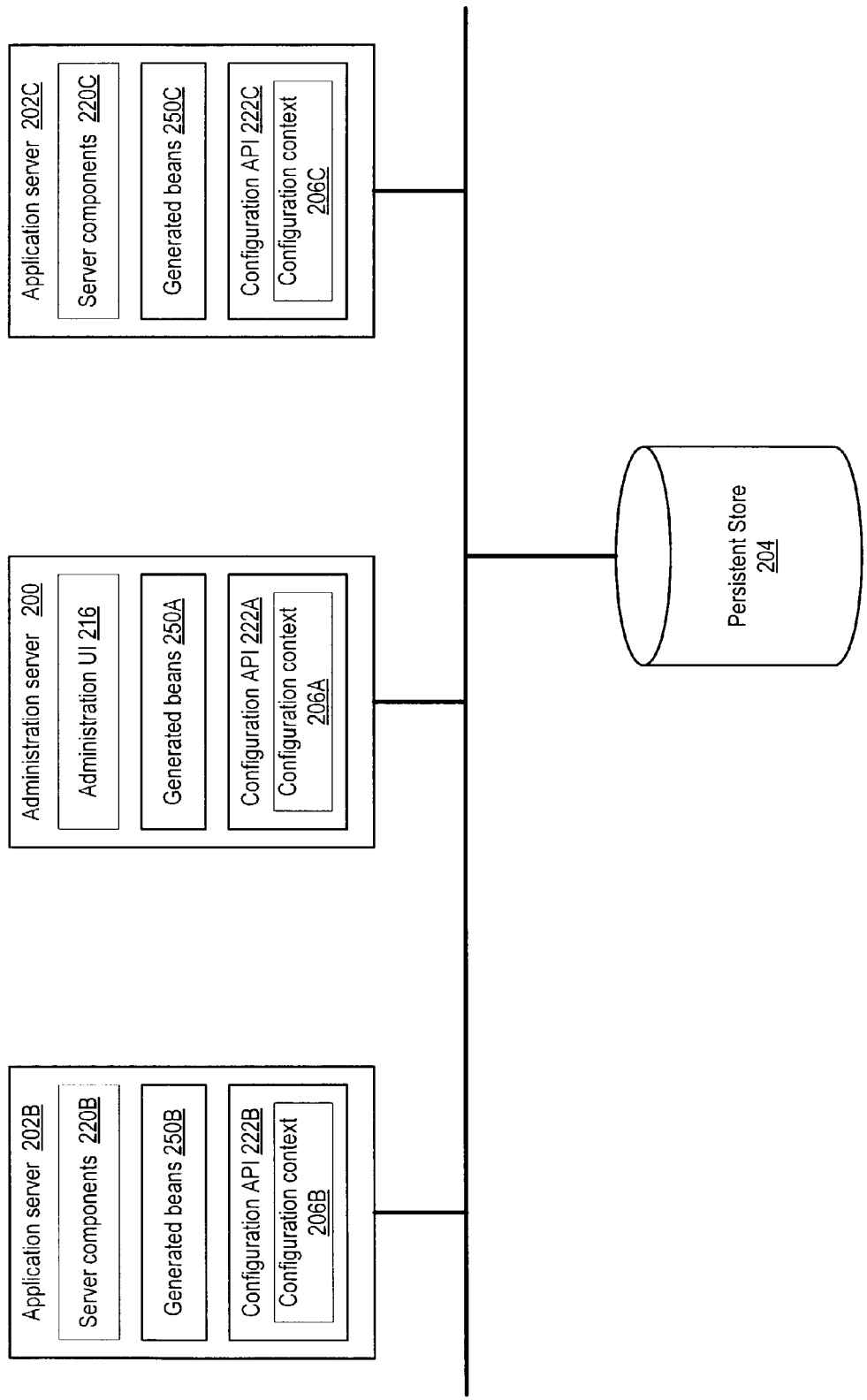
FIG. 4 illustrates an application server system implemented in accordance with a dynamic administration framework according to one embodiment.

FIG. 4 illustrates an application server system implemented in accordance with a dynamic administration framework according to one embodiment. In one embodiment, each server instance (servers 200 and 202) is an application server. In one embodiment, server instances 202 may be application servers, and one server instance may be designated as an administration server 200 for administering the server system. In one embodiment, user applications may not be deployed to an administration server 200. In one embodiment, each server instance is a Java 2 Enterprise Edition (J2EE)-compliant container. In one embodiment, a J2EE server instance may accept requests for non-J2EE style static and dynamic web content, for example through NSAPI (Netscape Server API) support.

A server system may include a persistent store 204 that includes configuration information for one or more server instances such as application servers 202A and 202B and an administration server 200. In one embodiment, the configuration information may include information that is common to the server instances. The server instances may be viewed as clients of the persistent store 204.

In one embodiment, the administration framework generation mechanism as described herein may be used during the development process. In one embodiment, a meta-information file may be generated by users of the server system. In one embodiment, the users may represent the configuration information in the meta-information file in a desired format, and the framework generator may generate one or more components of the administration framework. Once the administration framework is generated, the administration framework may be compiled with application server or system-specific components.

In one embodiment, when the system is ready to go from development to a production environment, a production generation of the administration framework may be performed and the system may be deployed. Deployment may include implementing beans 250 and configuration context 206 on servers 202 to which the server system is to be deployed. Each server 202 may include server components 220 (e.g. applications provided by the servers 202) which may access configuration data managed in memory by configuration context 206 via beans 250.

Embodiments of the dynamic administration framework as described herein may provide storage and location transparency to the persistent store 204 for the servers 202 and 204. Using the administration framework, the servers may not need to know the location(s) of persistent store 204 and/or the storage model of the configuration data. The administration framework may be independent of storage type of the persistent store 204 and may isolate client code from storage details. For example, file-based storage may be supported during system development and Lightweight Directory Access Protocol (LDAP)-based storage may be supported during production. The administration framework may provide a single point of access for core server, administration and application configuration. The administration framework may provide consistent in-memory representation of the configuration information.

One embodiment may provide an event-driven change management mechanism. In one embodiment, a configuration context 206 on the administration server 200 may be changed. Each server 202 may register a listener with the administration server 200 to listen for change notification events generated by the administration framework on the administration server 200. A user may access the generated administration UI 216 on administration server 200 to change an element of the configuration data as represented in memory by configuration context 206A. The administration UI 216 may then locate and access one or more of beans 250A to access the element. The one or more beans may then use the generic interface provided by configuration API 222A to access and, if needed, modify the element in persistent store 204. The changes may be serialized and sent to one or more other application servers 202 that have a global configuration context 206 in memory and that have registered listeners. The serialized changes may be deserialized on the receiving server 202 and the configuration context may be updated in memory. The administration server 200 may save the changes to the persistent store 204. In one embodiment, the application servers 202 never go to disk for updates. The application servers 202 receive notifications of changes and update their configuration contexts 206 in memory. Thus, changes to configuration data may be sent to multiple instances of a server 202. The changes may be propagated to any instance of the server 202 with a registered listener.

Figure 5:
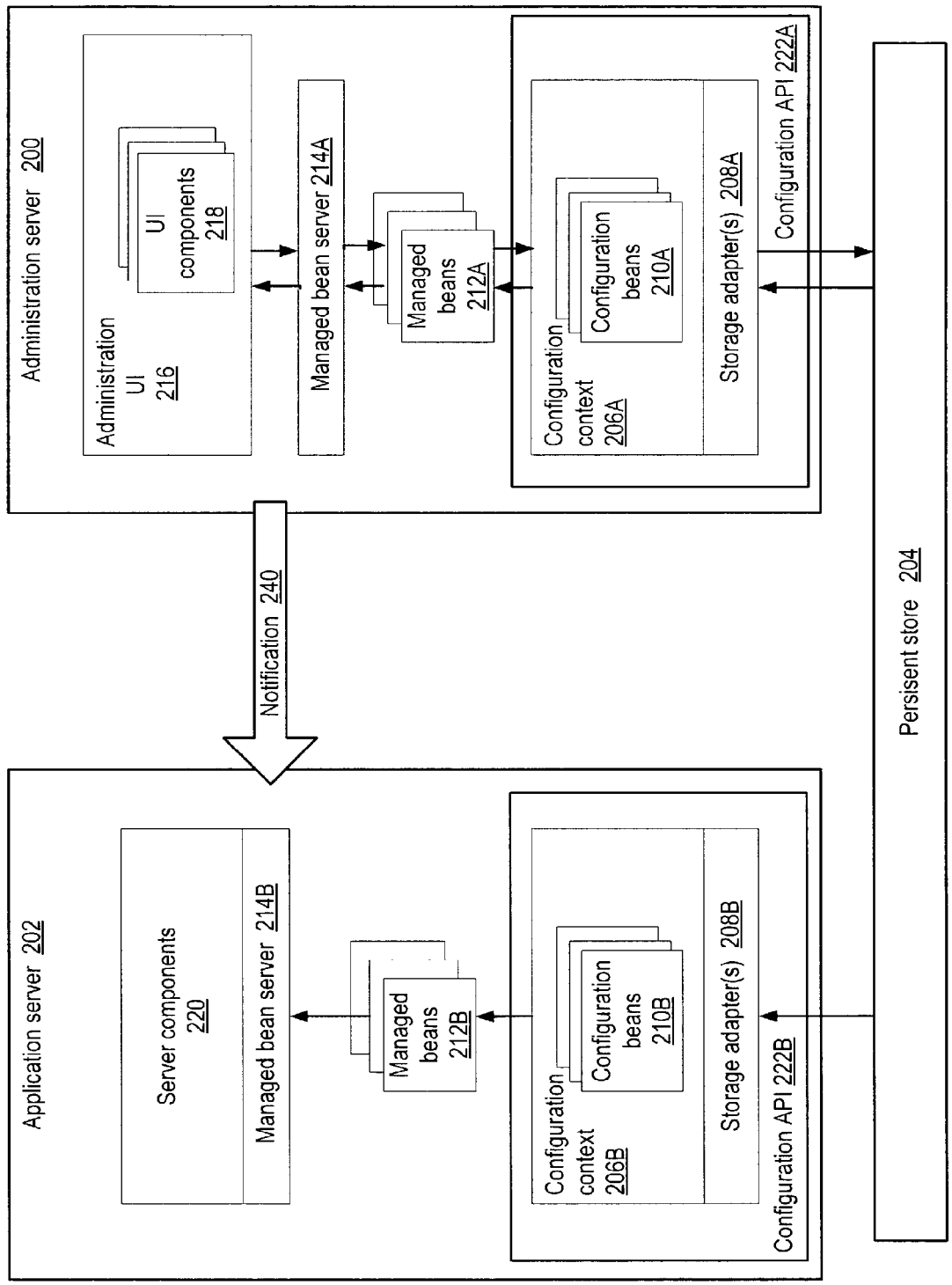
FIG. 5 further illustrates an application server system implemented in accordance with a dynamic administration framework according to one embodiment.

FIG. 5 further illustrates an application server system implemented in accordance with a dynamic administration framework according to one embodiment. A server system may include a persistent store 204 that includes configuration information for one or more servers such as application server 202 and administration server 200, which may be viewed as clients of the persistent store 204.

In one embodiment, the administration framework may be a stack including several layers. Embodiments may address the generation of the administration framework components and runtime behavior of those components. In one embodiment, the runtime system includes a presentation layer (e.g. administration UI 216), a management layer (e.g. management beans 212 and management bean server 214), a data representation layer (e.g. configuration context 206 and configuration beans 210), a configuration API 222 (which may include configuration context 206 and storage adapter(s) 208) and a persistent store 204. Embodiments may generate components of one or more layers of the stack, which may include the presentation layer, management layer and data representation layer. The configuration APIs for each system may include a configuration context 206 that keeps track of changes performed to the configuration in the system.

In one embodiment, the generated administration framework may provide a unified view and access (via the configuration API) to administration information (persistent store 204) that may be distributed across multiple locations and multiple storages. For example, given a new DTD and a specified location for attaching to an existing configuration context, a unified access/view may be generated for this subtree from the same configuration context. Thus, the administration framework may be used to administer complex applications such as an application server system including a multiple machine configuration and complex clusters.

In one embodiment, the administration framework data representation layer may include an Application Programming Interface (API), which may be referred to as a configuration API 222. The configuration API 222 may be an interface to the persistent store 204, and thus may abstract the persistent store 204 from the clients of the API (e.g. the application servers) and thus may provide flexibility of storage and location transparency to the clients. The configuration API 222 may include convenience objects or beans (configuration beans 210) that may represent elements in the persistent store 204. The configuration beans 210 may be generated and may encapsulate the configuration data in-memory for access at runtime. In one embodiment, the configuration beans 210 may inherit from a common class that hides the data access mechanism(s).

Configuration beans 210 may include "get" and "set" methods for the attributes of the corresponding elements. These generated methods may implement the constraints define in the meta-information 226. Elements may have sub-elements that may be used to describe hierarchical data of the system. For example, the element called server may have sub-elements called web-container, resources, applications, etc. Each of these sub-elements may also have sub-elements and attributes. In one embodiment, the generator mechanism 224 may generate one configuration bean 210 per element. The generator mechanism 224 may generate one or more configuration bean methods to describe the containment relationship between two elements. These methods may facilitate adding, removing, and replacing a sub-element, or accessing a sub element give a primary key, for example. A primary key may be included in the meta-information for each element, and may include one or more of the attributes of the element. For example, the primary key for the server element may be its name, since servers may have different names. Other configuration bean methods may also be generated, for example for getting the number of sub-elements of a certain type (e.g., the number of applications for the server).

The configuration API 222 may provide a generic interface to manage (e.g. create, read, validate, write and/or delete) the system configuration information in persistent store 204 and the generated configuration beans 210. The configuration API 222 abstracts persistent information in persistent store 204 from the clients of the configuration API 222. The configuration API 22 may provide storage transparency for the clients of persistent store 204. The data used by the administration framework may be kept in the persistent store 204. The administration framework, through the configuration API 222, is independent of the technology used in the persistent store 204. The generated administration framework and its components may use the configuration API 222 to provide support for any type of persistent store 204. For example, the persistent store 204 may be an XML file, an object database, a relational database or any other type of file-based or database repository.

Clients of the configuration API 222 may do a lookup using the configuration API 222 to get an in-memory representation of the corresponding configuration data from persistent store 204. This data for may be, for example, a representation of a Java Properties file, an XML file or other file including configuration information. The configuration API's clients may include one or more of, but are not limited to, an administration server, a deployment backend, and the containers that comprise the server. The deployment backend may register applications and/or modules and then register the URLs of those applications and/or modules. The configuration API 222 supports the deployment backend by providing the ability to store these values in the meta-information file, enabling containers (e.g. EJB containers) and other entities to query for them.

The configuration API 222 may include one or more of, but is not limited to, a configuration context 206, configuration beans 210, a configuration factory for creating the beans, and a mechanism (e.g. XPath) to look up the beans, a notification mechanism, and a change management mechanism. Configuration API 222 functionality may include, but is limited to, one or more of, basic configuration operations (e.g. set and get elements and attributes APIs), event notification, cloning, bean lookup mechanism (e.g. XPath) support, change management (e.g. add, update, delete, set), read only operations, auto commit, advanced configuration (e.g. one API to access attributes), intelligent refresh, get DTD default values, DOM-like API support (e.g. appendChild, removeChild), finding APIs, serialization and deserialization.

The configuration API 222 may provide support for distributed systems. In one embodiment, the configuration API may include a configuration context 206 that may be used to write consistently to multiple storages on different machines with a single operation. In one embodiment, a configuration context 206 may be created on a server during server initialization. Containers may use the configuration context 206 to look up configuration data of interest. In one embodiment, the configuration API 222 may provide hierarchical semantics into the configuration data. The configuration API 222 may be used to iterate through nodes and navigate to a desired attribute.

In one embodiment, the configuration context 206 may encompass the configuration information from the meta-information file. APIs may be provided to the configuration context 206 for functions including one or more of, but not limited to: reading from, refreshing, and writing to the persistent store 204; tracking and managing changes to the configuration context 206; looking up a bean or multiple beans (e.g. using XPath); and factory class for generating and/or deleting configuration contexts 206 and/or components (e.g. configuration beans) of configuration context 206.

A configuration context 206 represents a hierarchical view of the configuration attributes from persistent store 204 as represented in the meta-information file. The configuration context 206 may read the configuration attributes from the meta-information file. In one embodiment, a configuration factory may be provided to construct a configuration context 206. The configuration context 206 may have a one-to-one relationship with the meta-information file.

In one embodiment, elements of the configuration data may be represented by the generated configuration beans 210. In one embodiment, each element is represented by a corresponding configuration bean 210. In one embodiment, some elements (e.g. PCDATA elements) may be attributes in a parent element. For example, to change an element in a DTD, a configuration context 206 may be accessed to lookup a configuration bean 210 representing that element. APIs provided by the bean may then be used to manage the element. Configuration beans 210 may include generic and specific APIs. Generic APIs may be used on the base class, e.g., getAttributeValue, setAttributeValue, appendChild, etc. Specific APIs may be used on the specific bean, e.g., addJmsResource, getName, etc.

In one embodiment, the configuration context 206 may be obtained from cache or created, which may include generation of configuration beans 210. In one embodiment, the configuration beans 210 may be generated by a configuration factory of the configuration API 222. In one embodiment, once a configuration context 206 is obtained, configuration beans 210 may be looked up using an exact lookup mechanism or a lookup that accepts a query language generic to the data storage format of the persistent store, e.g. XPath, statement.

In one embodiment, the configuration context 206 may include a notification mechanism that allows clients to register a listener if the clients desire to hear about changes. The configuration context may send notification about configuration changes (e.g. add, update, delete, set, etc.) to all registered listeners as indicated at 240 of FIG. 5.

In one embodiment, the configuration context 206 may track configuration changes. One embodiment may provide mechanisms for obtaining or resetting the changes in the configuration context 206. The configuration changes may be serialized and sent "across wire" to one or more other configuration contexts (for example, in other VMs and/or on other server systems) to be updated on the other configuration contexts 206. In one embodiment, a query language (e.g. XPath) may be used to track where to make the changes.

In one embodiment, a query mechanism may be provided that uses a query language to access the persistent store 204 (through the configuration beans 210) and to hide the persistent store 204 implementation. In one embodiment, XPath may be used as the query language to navigate through the hierarchical structure of the configuration data and to address parts of the data. Other embodiments may use other query languages than XPath. To provide storage transparency, the query mechanism may run on top of any storage implementation, for example XML and LDAP implementations.

In one embodiment, using the query language (e.g. XPath), from a simple description (e.g. a String), a corresponding configuration bean may be created and/or accessed in memory without having to navigate from the top of the hierarchy. The configuration beans may include "get element" and "set element" methods for the attributes and sub-elements of an element. These get and set element methods may accept the name of the element and the name of the attribute, and may accept or return an element or attribute value (depending on the method) when invoked to perform an operation on the element.

The query language (e.g. XPath) may allow a configuration attribute in a tree of data to be uniquely identified. The query language may be used for updating changes in other configuration contexts 206. Listeners may listen for changes and get the changed value using the query language.

In one embodiment, the configuration API 222 may include one or more storage adaptors 208 that may support multiple accesses in read or write mode to the data of persistent store 204. The configuration API 222 may handle concurrent access and may manage and/or prevent conflicts. In one embodiment, the configuration API 222 may manage the number of instances of the configuration context 206 in the server system to prevent the configuration context 206 from overwriting changes in persistent store 204. In one embodiment, the configuration API 222 may detect stale data in the configuration context 206 due to changes in storage. In one embodiment, the configuration API 222 may keep track of and otherwise manage changes in the configuration context 206.

The management layer may include management beans 212 that include the business logic of the system. The management beans 212 may be generated by the generator mechanism 224 from meta-information 226, and may be used as base classes by the developer to add application-specific business logic. The management beans 212 may expose the management interface to the external world. Business logic implemented by a management bean may include (more or less) complex validation that may involve (e.g. access and potentially modify) one or more data elements. Thus, a management bean 212 may access one or more configuration beans 210 in performing the business logic as indicated by the management bean 212. In one embodiment, configuration beans 210 do not themselves include any business logic.

In one embodiment, the management beans 212 generated by the generator mechanism 224 may be MBeans, Java beans that adhere to the JMX standards. In one embodiment, MBeans may be one of several types as defined by the JMX specification including, but not limited to, standard, dynamic and model MBeans.

In the management layer, using the management beans 212, application-specific integrity constraints and/or business logic that interact with the administered application(s) may be coded. In one embodiment, the management beans 212 may encapsulate business logic that may include rules (which may be dynamic) that are application-dependent. The management beans framework allows the developer to enter these business rules as management bean methods.

In one embodiment, a dependency relationship may exist between configuration beans 210 of the data representation layer and the management beans 212 of the management layer. Management beans 212 may be generated to work with the generated configuration API 222 components (e.g. configuration beans 210). Each management bean 212 may reference the configuration context 206 and look up one or more configuration beans 210, e.g. using XPath. The configuration beans 210 may be used to perform functions including, but not limited to, getting and setting attributes of the persistent store 204, on behalf of the business logic as defined in the management beans 212.

The data representation layer and its configuration beans 210 may implement static validation of particular elements and attribute values, and may be responsible for persisting the data in a transparent way. The management layer and its management beans 212 may implement business rules that may access one or more attributes or administered elements at a time and that may apply business rules to them. For example, the management bean 212 representing a server element may have methods that may start or shut down a server. This operation may involve many attributes of the server element as well as other attributes in other elements. These methods, implemented by the management layer, may be complex and may involve multiple, potentially heterogeneous attributes and elements. The methods access the attributes and elements of the configuration data through corresponding configuration beans 210 of the data representation layer.

In one embodiment, the presentation layer may be Web-based and may include components 218 including, but not limited to, one or more of servlets, JSPs, HTML documents, and images. In one embodiment, the presentation layer may be packaged as a Web Application. The presentation layer may be an administration user interface (UI) 216 that provides support for the user to administer the system. The presentation layer may be generated, and the generated presentation layer administration UI 216 may be used for administration of the generated management beans 212 (business logic) of the management layer. In one embodiment, the generated administration UI 216 may include one or more servlets for driving the administration UI 216, and one or more JSPs for each page of the UI. These JSPs may be customized by users if desired. The administration UI 216 allows the user to perform management operations of the system including, but not limited to, one or more of: creating configurable items (elements); entering attribute values for the elements; configuring the elements (e.g. changing property values of the elements); validating the changes against rules described in the meta-information (e.g. through calls to the Management beans); persist and/or retrieve changes; handling multiple access to the configuration store; deleting configured elements; getting lists of items; selecting items from lists; grouping related items into presentation pages; and navigating from items to related items (e.g. via links). The relationships between the items may be described in the meta-information.

In one embodiment, the runtime framework used by the generated presentation layer may be Sun's Sun ONE Application Framework (JATO). The JATO framework unites familiar concepts such as display fields, application events, component hierarchies, and a page-centric development approach, with a design based on the Model-View-Controller. In one embodiment, the generated code may include a view and controller Layer including Java Beans called View Beans, as well as Beans inheriting from the JATO-predefined View Objects, and JSP using these ViewBeans. In one embodiment, the generated code may also include a Model Layer that may serve as the glue between the JATO framework and the back-end management beans layer. In one embodiment, the JSPs may be customized to change the look and feel of the pages and to add, remove or modify icons and other interface items. Such modifications may be made without affecting the business logic of the system.

In one embodiment using JMX, third party tools may be integrated for administration instead of using the generated administration UI 216. In one embodiment, JMX-enabled components may be added to the administration UI 216. The administration UI 216 may detect new components and may expose interface(s) to the detected components.

Figure 6:
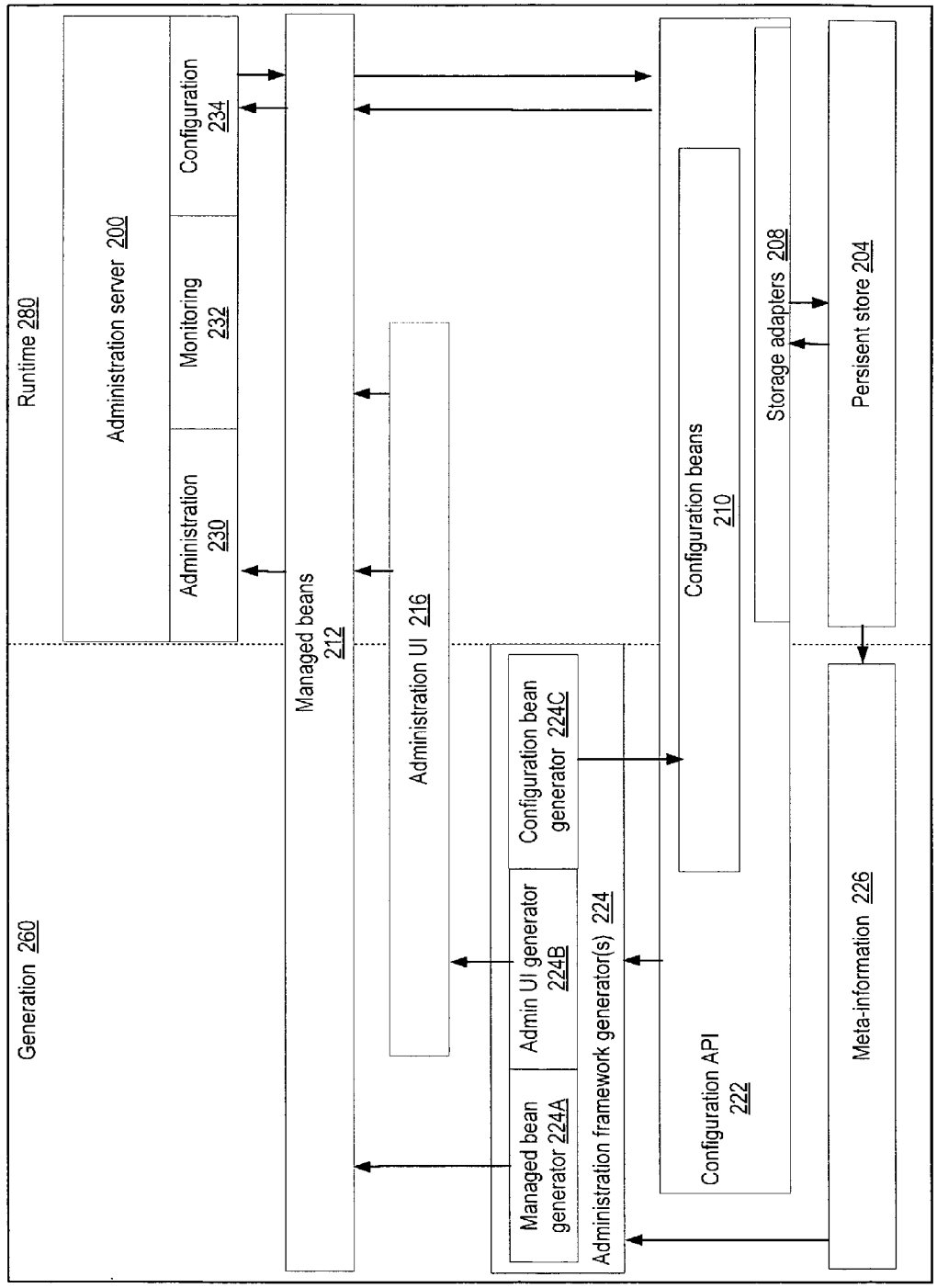
FIG. 6 illustrates the generation and runtime aspects of the administration framework according to one embodiment.

FIG. 6 illustrates the generation and runtime aspects of the administration framework according to one embodiment. At generation 260, meta-information 226 may include a representation of the elements and element attributes of persistent store 204. Meta-information 226 may be represented in formats including, but not limited to, markup languages such as XML, schemas, DTDs, etc. In one embodiment, all meta-information may be contained in one file (e.g. an XML file or a schema file). In one embodiment, meta-information 226 may be accessed by the administration framework generator(s) 224 to generate components of the administration server to be used at runtime for monitoring and managing the system. In one embodiment, a management bean generator 224A may generate one or more management beans (e.g. MBeans) 212 of the management layer, each representing business logic of the server. In one embodiment, a configuration bean generator may generate one or more configuration beans 210 of the data representation layer. In one embodiment, an administration UI generator 224 may generate one or more components of the administration UI 216 (the presentation layer) for use in displaying, locating, accessing, managing and modifying configuration elements and/or attributes as represented in the configuration beans 210.

At runtime 280, the generated administration UI 216 of the presentation layer may be used to access the management layer (e.g. management beans 212) to perform administration 230, monitoring 232 and configuration 234 operations.

The administration server may allow changes to the configuration of a running application server instance. These configuration changes may result in a notification to the core system. In one embodiment, some changes may require a server restart before they take effect. Changes may be categorized as application changes, resource changes and other changes.

In one embodiment, application (or standalone module) attributes may be changed dynamically. A change may result in the new application attributes going into effect immediately; any new requests will get the new configuration. In one embodiment, existing application instances may generate exceptions on lookups or other accesses. In one embodiment, resources may or may not change dynamically.

Event Notification Mechanism

One embodiment may include an event notification mechanism that may allow events (e.g. changes in configuration data) to be propagated in a distributed system running several virtual machines (VMs) (e.g. Java Virtual Machines (JVMs)). In one embodiment, each VM may be an execution engine of an application server. While described herein in reference to distributed application server systems, embodiments of the notification mechanism as described herein may be used in other types of distributed systems.

The configuration API may support the administration server to update configuration data of multiple server components. Any server component that has configuration data may need to be updated by the administration server. The components may have configuration data and accessors to those data (e.g., IMQ).

Figure 7:
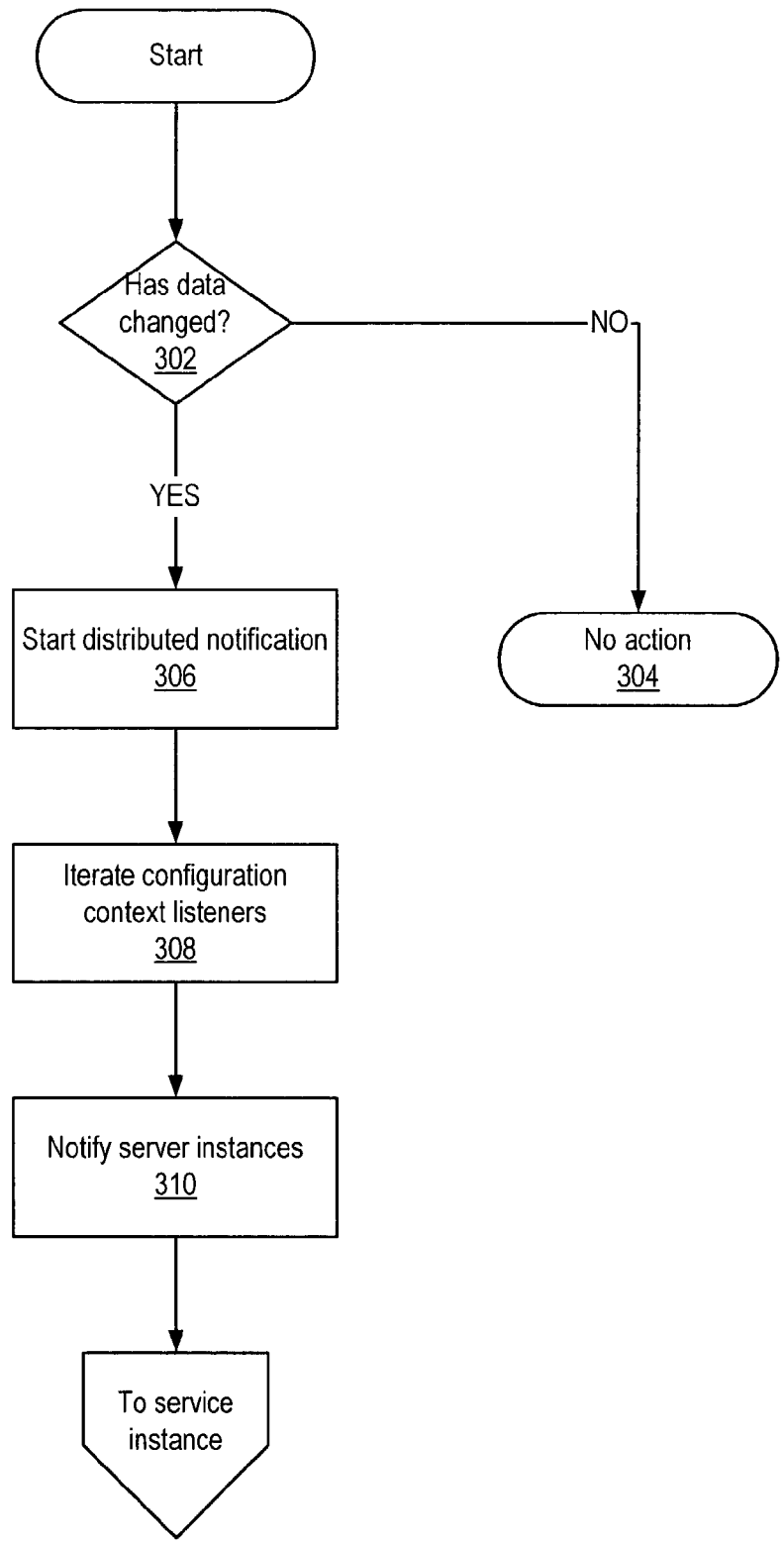
FIG. 7 is a flowchart illustrating a method of event notification according to one embodiment.

FIG. 7 is a flowchart illustrating a method of event notification according to one embodiment. Changes may be applied to configuration data on the administration server. These changes may be tracked, for example by the configuration context. At 302, a check may be made, for example by the event notification mechanism, to see if changes (e.g. add, update, delete, set, etc.) have been made to the in-memory configuration data. If no changes have been made, then no event notification action may be performed as indicated at 304. In one embodiment, an event mechanism may be used rather than a check being made to detect changes. In this embodiment, a change to configuration data (e.g. through access of a configuration bean) may trigger a notification event.

As indicated at 306, if changes have been made, then the event notification mechanism may start the distributed notification to inform clients (e.g. other server instances) of the changes. Clients may have registered listeners with the event notification mechanism. As indicated at 308, the registered listeners may be iterated, and server instances with registered listeners may be sent event notification(s) as indicated at 310. Server instances that receive event notifications may update the appropriate elements and/or attributes in memory as indicated by the event notification(s).

Using this mechanism, only configuration data changes are sent to registered server instances. Modifications to configuration information are made in-memory on the administration server, and notifications of the changes are sent to registered server instances. Using this mechanism, the event notification mechanism and configuration information updating on server instances are performed without having to go to the persistent store to store or retrieve configuration data.

Figure 8:
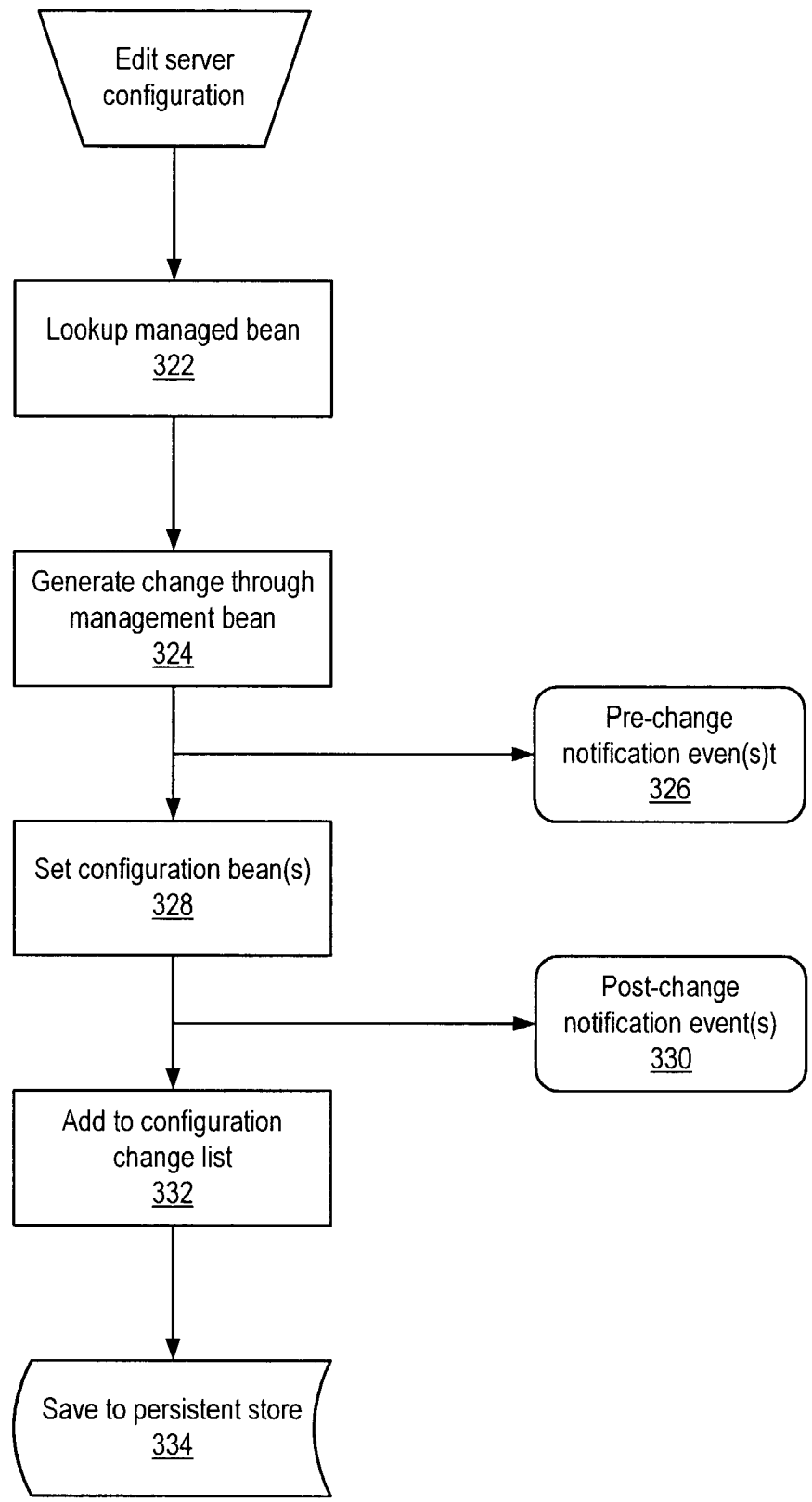
FIG. 8 is a flowchart illustrating a method of configuration change handling on an administration server according to one embodiment.

FIG. 8 is a flowchart illustrating a method of configuration change handling on an administration server according to one embodiment. As indicated at 322, a lookup of a management bean (e.g. MBean) may be performed, for example using XPath. A management bean located by the lookup may be accessed to generate a configuration data change for one or more configuration elements or attributes affected by the management bean's business logic as indicated at 324. A pre-change notification event or events may be generated as indicated at 326. The configuration bean(s) corresponding to the elements or attributes set on the management bean may be set as indicated at 328 to perform the in-memory configuration change in the configuration context as indicated at 328. A post-change notification event or events may be generated as indicated at 330. The changed element(s) or attribute(s) may be added to a configuration change list for the persistent store as indicated at 332. The changes in the configuration change list may be saved to the persistent store as indicated at 334.

In one embodiment, the event notification mechanism may use the configuration API configuration context, which tracks changes done to the configuration in a virtual machine (VM). These changes may be obtained/reset anytime from the configuration context. In order to send notifications to another VM, a set of configuration changes may be serialized and sent "across the wire" to another configuration context in another VM.

Using the configuration API, the receiving VM may incrementally apply only the changed elements to its instance of the configuration context. In one embodiment, a query language (e.g. XPath) may be used to determine the locations of changes in the configuration context.

The notification mechanism, built upon the configuration API, may be abstracted from the details of the persistence of the configuration data (including what is loaded into memory versus what is in the persistent store), and may be abstracted from the tracking of changes. In addition, the serialization mechanism may avoid reloading from any persistent back-end store in every receiving VM.

In one embodiment, notifications may be sent over a RMI (Remote Method Invocation) channel between VMs using a wire protocol (e.g. JRMP wire protocol). In one embodiment, the changes cached in the configuration context may be categorized into one or more notifications; there may be a many-to-many relationship between configuration context cached changes and notifications.

Once the notifications are received in the target VM, the associated configuration changes may be applied to an instance of the configuration context in that VM. The notifications may then be passed on to registered listeners, along with a copy of the modified configuration context. Once the listeners successfully complete the change processing, the global configuration context in a target VM may be replaced by the modified configuration context.

The notification mechanism and handling of configuration changes may be generic and the same mechanism may be applied to other distributed middleware. The application-specific handling resides in the categorization of configuration changes to notifications, and the implementation for the categorization mechanism may be pluggable to achieve desired application-specific handling.

Figure 9:
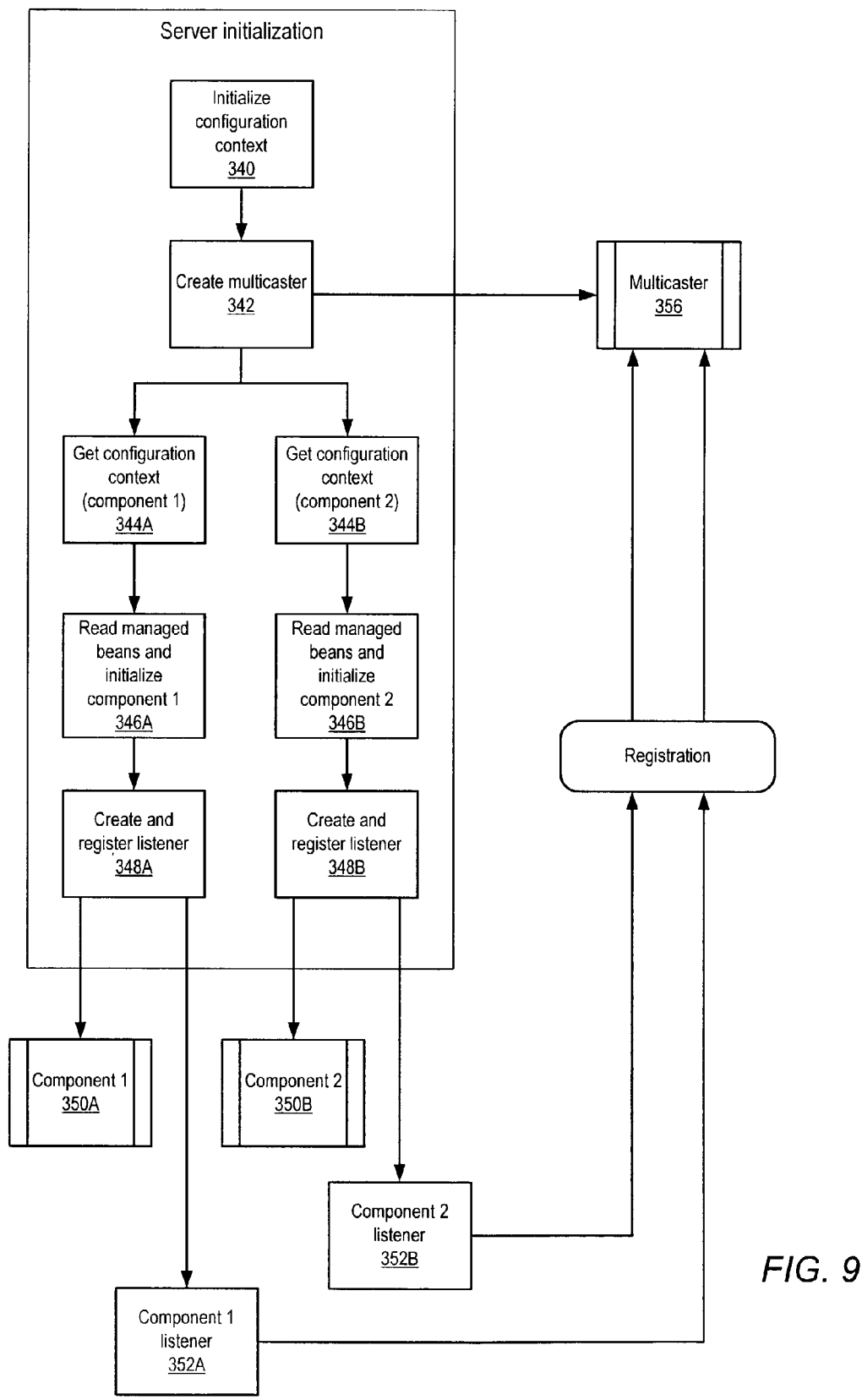
FIG. 9 is a flowchart illustrating a server initialization process in an application server system using the administration framework generating components (e.g. server instances), listeners for the components, and a multicaster component of the event notification mechanism according to one embodiment.

FIG. 9 is a flowchart illustrating a server initialization process in an application server system using the administration framework generating components (e.g. server instances), listeners for the components, and a multicaster component of the event notification mechanism according to one embodiment. During server initialization, a configuration context may be initialized or created (e.g. by a factory of the configuration API) as indicated at 340. A multicaster 356 may be generated as indicated at 342. The multicaster may be a component of the event notification mechanism that receives configuration change events and distributes the events to listeners 352 corresponding to components 350. The server initialization process then creates one or more components. As indicated at 344A and 344B, an instance of the configuration context (whose configuration beans were generated in the administration server) may be created for each component being generated. As indicated at 346A and 346B, the generated management beans (e.g. MBeans) of the administration server may be read to generate corresponding MBeans for each component being generated, and the components may be initialized. As indicated at 348A and 348B, listeners 352 may be created for each component 350 being generated, and the created listeners 352 may be registered with the administration server (e.g. with the multicaster 356) so that the newly generated components 350 (e.g. server instances) may receive notification events of changes in configuration maintained in-memory by the configuration contexts.

Figure 10:
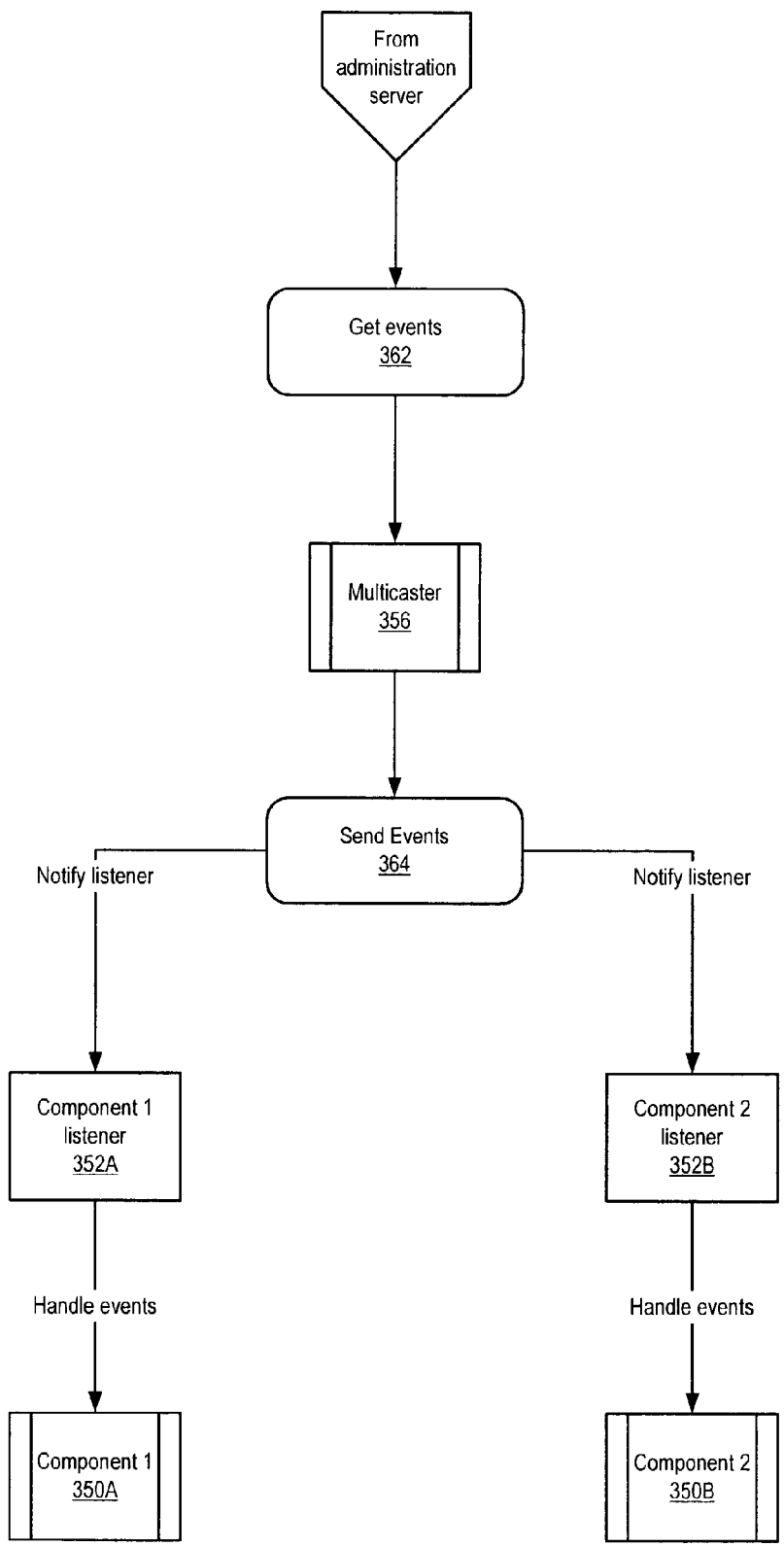
FIG. 10 is a flowchart illustrating a multicaster sending notification events to registered components generated using the method of FIG. 9 according to one embodiment.

FIG. 10 is a flowchart illustrating a multicaster sending notification events to registered components generated using the method of FIG. 9 according to one embodiment. One or more events indicating the in-memory change of configuration data may be generated on the application server. As indicated at 362, the multicaster 356 may get the generated one or more events. As indicated at 364, the multicaster may multicast the events to registered listeners 352, if any, to notify the listeners of the indicated configuration changes. The events may then be provided to the components 350 corresponding to the listeners 352 to handle the events, e.g. by updating the configuration context of the components 350 with the modified configuration information. Note that, during this process, the components 350 do not have to go to the persistent store to retrieve changed elements and/or attributes.

Pluggable Verification and Validation for Configuration Data

As previously mentioned, embodiments may provide data transparency for storage information that allows different implementations to be used for the persistent store data, e.g. XML, LDAP, database, etc. Some implementations may include parsers (e.g. parsers for XML data) that may validate data, but that may have restrictions. If the data is in a database, LDAP, or other storage implementations, parsers may not be used.

One embodiment may provide a pluggable semantic verification and syntactic validation mechanism for configuration data. One embodiment of this data verification and validation mechanism may be reusable in stand-alone (off-line) applications and in the application server (on-line). In one embodiment, this mechanism may be based on the configuration API. In one embodiment, this mechanism may be generic, pluggable, and extensible. This mechanism may be transparent to factors such as the type and location of storage. In one embodiment, the data verification and validation mechanism may be implemented as one or more pluggable modules that may be plugged into the configuration API framework. In one embodiment, data-specific information may not be hard-coded in the configuration API to keep it generic. This mechanism may be referred to as a generic test case mechanism or framework.

In one embodiment, a test case may include a java class that implements an interface that allows a check method to be called generically from the administration framework. This check method may return a result object that includes the result of the test, e.g. whether the test passed or failed, and that may include additional information on why the test failed, etc. In one embodiment, a list of test cases and other information on the test cases (e.g., when each test case is to be run, whether the test case needs to be run offline or online, etc.) may be kept in an editable file (e.g., a markup language file such as an XML file).

In one embodiment, the same test cases may be used both for off-line and on-line cases. One embodiment may provide for the propagation of exceptions in case of errors. One embodiment may support both warnings and errors. In the case of a warning, an operation may be executed and the user may be provided with a warning message.

Verification and validation of data may occur in multiple places, and the usage may vary. For example, data may need to be verified before the server starts up and accesses the data. As another example, the administration server may validate data before setting user-entered values. As yet another example, the user may validate data using a stand-alone program.

Figure 11:
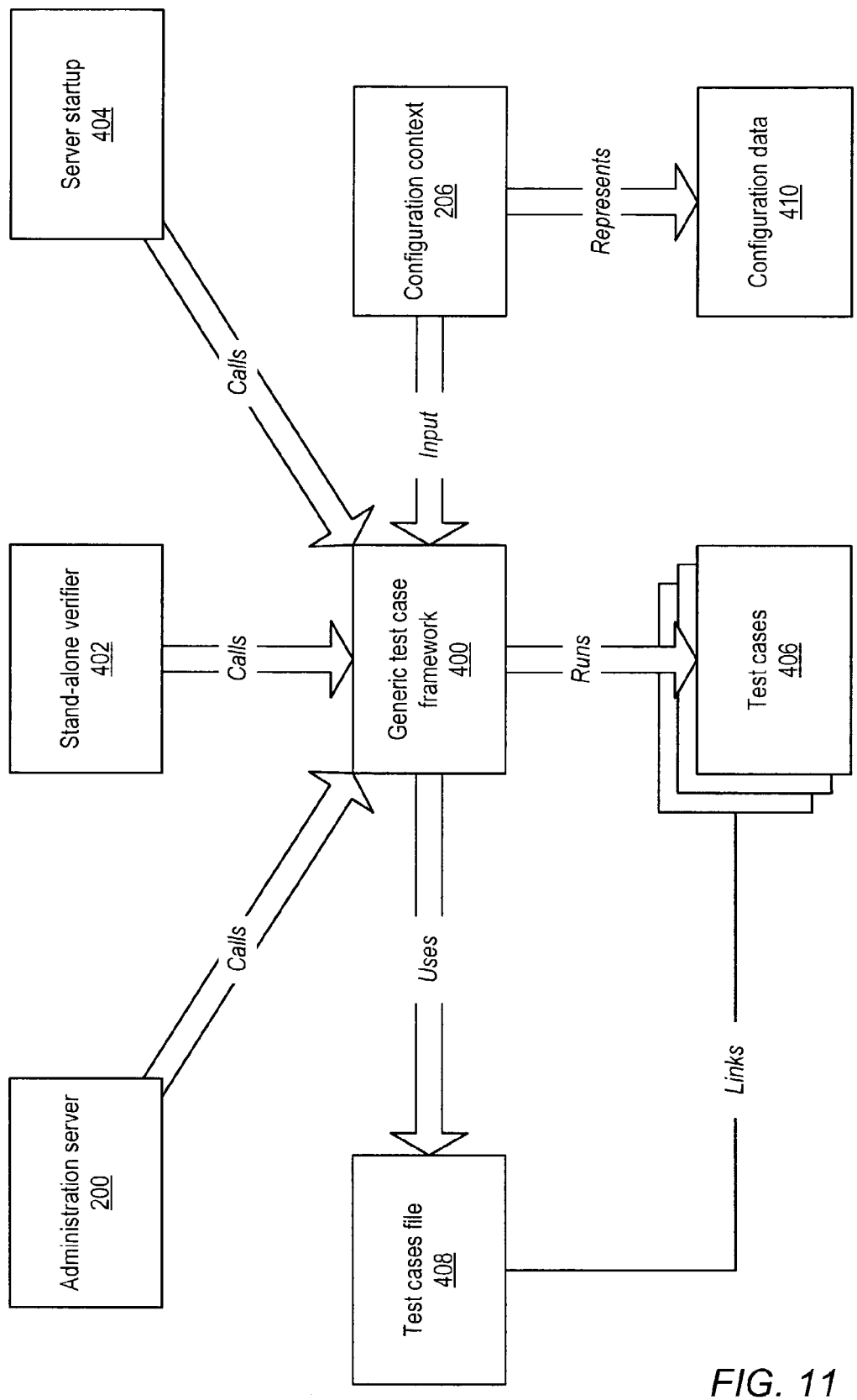
FIG. 11 illustrates an architecture of a pluggable verification and validation mechanism for configuration data according to one embodiment.

FIG. 11 illustrates an architecture of a pluggable semantic verification and syntactic validation mechanism for configuration data according to one embodiment. The generic test case framework 404 may be called by an administration server 200, a stand-alone verifier 402, or at server startup 404. The generic test case framework 400 may call one or more test cases 406 to verify and validate configuration data and/or changes to configuration data. In one embodiment, each test case 406 may implement an interface through which the generic test case framework 404 accesses and runs the test case 406. The generic test case framework 400 may use test case file 408, which may include a list of test cases 406, for example to locate test cases 406 and to get other information corresponding to the test cases 406 (e.g., when each test case 406 is to be run, whether the test case 406 needs to be run offline or online, etc.). In one embodiment, test case file 408 may be a markup language (e.g. XML) file. In performing a test case 406, the generic test case framework 400 may accept a configuration context 206 as input, which represents configuration data 410 in memory, and which may be provided to the generic test case framework 400 by administration server 200 or by stand-alone verifier 402.

Figure 12:
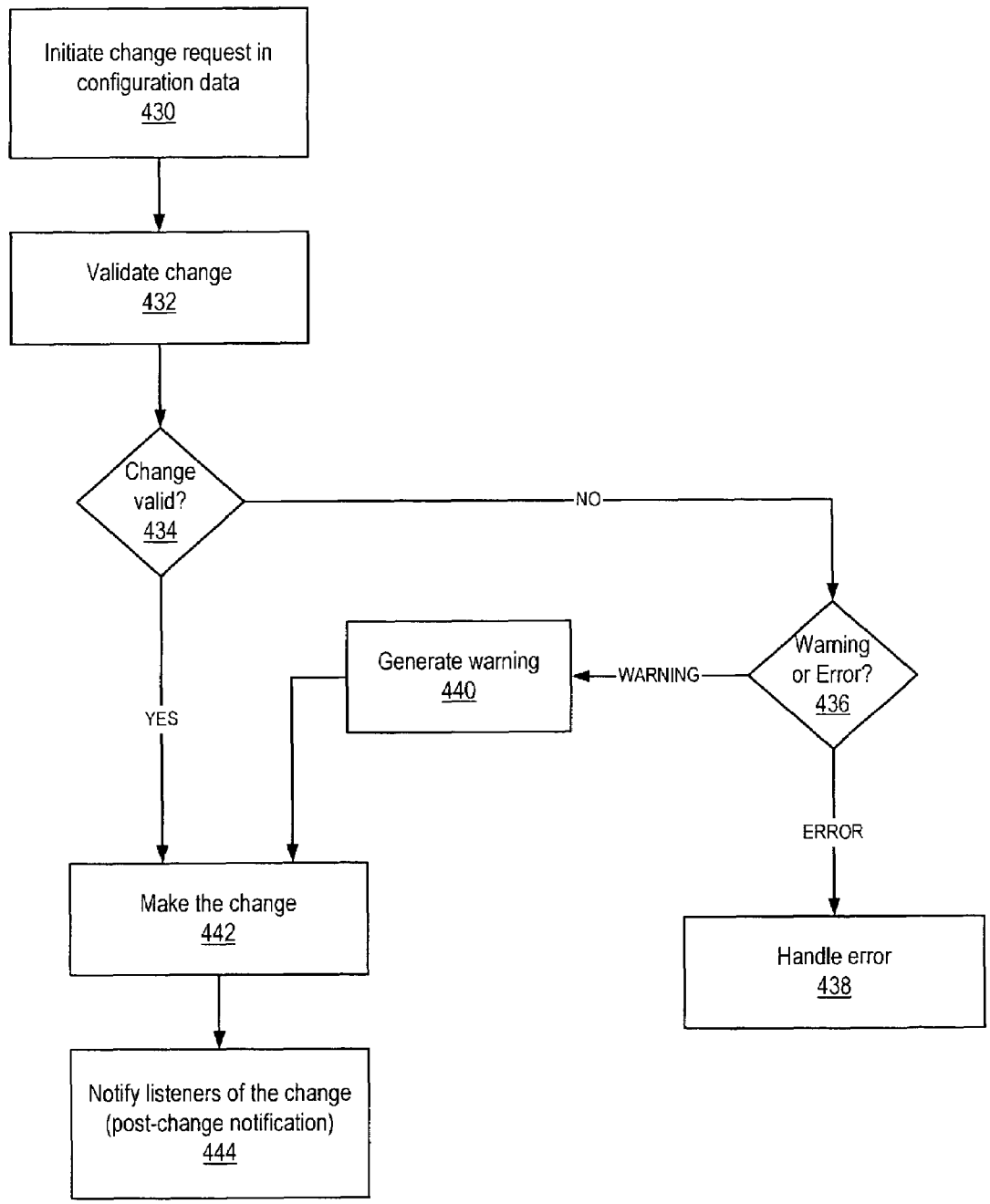
FIG. 12 illustrates a method of performing verification and validation according to one embodiment.

FIG. 12 illustrates a method of performing semantic verification and syntactic validation according to one embodiment. As indicated at 430, a change request may be initiated to change the configuration data. For example, a user may initiate a change request in the configuration data through the administration UI of the administration server. As indicated at 432, the verification and validation mechanism (e.g. generic test case framework) may validate the change. In one embodiment, the generic test case framework may access a test case file to get information on a test case corresponding to this change and, if the test case exists, may run the test case. The generic test case framework may accept a configuration context as input when running the test case.

At 434, if the change is determined to be valid, then the change may be made to the configuration data as indicated at 442. In one embodiment, the user may be notified of the successful change. At 434, if the change is determined to be invalid, then at 436, if the change is invalid due to an error, then the error may be handled as indicated at 438. In one embodiment, an exception may be thrown, which in one embodiment may result in an error message being displayed on the administration UI.

At 436, if the change is invalid due to a warning, then a warning message may be generated as indicated at 440, which in one embodiment may be displayed to the user on the administration UI, and the change may be made to the configuration data as indicated at 442. After the change is made as indicated at 442, then one or more listeners may be notified of the change. For example, the change may be made on an administration server, and the configuration API may send an event notification to registered listeners for one or more application servers so that the application servers may update instances of the configuration context to keep the instances in synchronization with the configuration context on the administration server.

Figure 13:
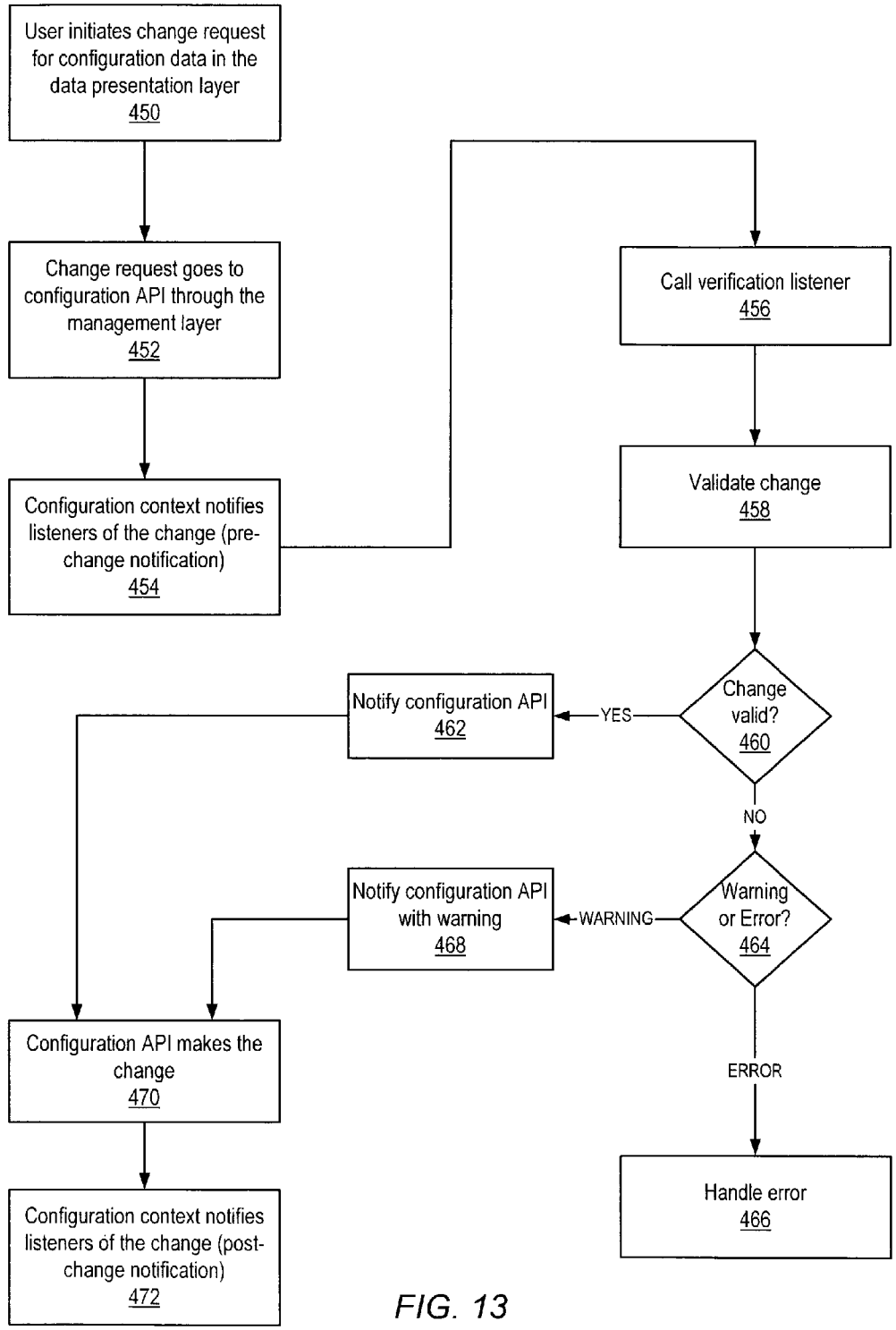
FIG. 13 further illustrates a method of performing verification and validation according to one embodiment.

FIG. 13 further illustrates a method of performing semantic verification and syntactic validation according to one embodiment. As indicated at 450, a user may initiate a change request in the configuration data through the administration UI of the administration server. As indicated at 452, the change request may go to the configuration API through the management layer (e.g. through a management bean of the management layer executing a management method of the administration server). As indicated at 454, the configuration context may generate a pre-change notification to notify one or more listeners of the requested change. One of the listeners may be a verification listener as indicated at 456. The verification listener may inform the verification and validation mechanism (e.g. generic test case framework) of the change, which may then validate the change as indicated at 458. In one embodiment, the generic test case framework may access a test case file to get information on a test case corresponding to this change and, if the test case exists, may run the test case. The generic test case framework may accept a configuration context as input when running the test case.

At 460, if the change is determined to be valid, then the configuration API may be notified as indicated at 462. At 460, if the change is determined to be invalid, then at 464, if the change is invalid due to an error, then the error may be handled as indicated at 466. In one embodiment, an exception may be thrown, which in one embodiment may result in an error message being displayed on the administration UI. At 464, if the change is invalid due to a warning, then a warning message may be generated, which in one embodiment may be displayed to the user on the administration UI, and the configuration API may be notified, with the warning, as indicated at 468. The configuration API may then make the change to the configuration data as indicated at 470. The change may be made to the configuration context and, in one embodiment, may be propagated to the persistent store of configuration data. After the change is made as indicated at 470, then the configuration context may send an event notification to one or more listeners as indicated at 472. For example, the change may be made at 470 on an administration server, and the configuration context may send an event notification to registered listeners at 472 for one or more application servers so that the application servers may update instances of the configuration context to keep the instances in synchronization with the configuration context on the administration server and in the persistent store.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of servers;
a data store comprising a persistent store of configuration information for the plurality of servers, wherein the persistent store is formatted in accordance with a data storage format;
wherein one of the plurality of servers comprises a generation mechanism configured to:
generate on the server an in-memory representation of the configuration information from meta-information describing the configuration information, wherein the in-memory representation of the configuration information is formatted in accordance with an in-memory data format; and
generate on the server a plurality of components from the meta-information describing the configuration information, wherein the plurality of components are configured to access the in-memory representation of the configuration information to perform server configuration tasks.

2. The system as recited in claim 1, wherein the server further comprises a user interface configured to access the plurality of components to perform the server configuration tasks in response to user input, wherein the generation mechanism is further configured to generate the user interface from the meta-information describing the configuration information.

3. The system as recited in claim 1, wherein the server is configured to provide an instance of the in-memory representation of the configuration information to each of one or more others of the plurality of servers, wherein each of the other servers is configured to access the server information from the provided instance of the in-memory representation of the configuration information.

4. The system as recited in claim 1, wherein the system is configured to generate an instance of the in-memory representation of the configuration information and an instance of the plurality of components on one or more others of the plurality of servers, wherein each instance of the plurality of components is configured to access the corresponding instance of the in-memory representation of the configuration information to perform configuration tasks of the particular server.

5. The system as recited in claim 1, wherein the server further comprises a configuration Application Programming Interface (API) configured to provide access to the persistent store for the plurality of components independent of a location and the data storage format of the persistent store.

6. The system as recited in claim 5, wherein the configuration API is further configured to provide access to the persistent store for the plurality of components in accordance with a different data storage format in response to a change of the data storage format of the persistent store to the different data storage format.

7. The system as recited in claim 1, wherein the plurality of components each comprise:
one or more program methods each configured to perform business logic of the server; and
one or more access methods for accessing the in-memory representation of the configuration information.

8. The system as recited in claim 1, wherein the configuration information comprises a plurality of elements, wherein, to generate on the server an in-memory representation of the configuration information from meta-information describing the configuration information, the generation mechanism is further configured to generate a plurality of configuration components comprising the in-memory representation of the configuration information, wherein each of the configuration components represents one element of the configuration information.

9. The system as recited in claim 8, wherein each of the configuration components comprises one or more access methods for accessing the element of the configuration information represented by the configuration component.

10. The system as recited in claim 8, wherein the plurality of configuration components are Java beans.

11. The system as recited in claim 1, wherein one or more of the plurality of components are management components each comprising one or more program methods configured to access the in-memory representation of the configuration information to perform a particular one of the server configuration tasks.

12. The system as recited in claim 11, wherein the management components are Java Management Extensions (JMX) MBeans.

13. The system as recited in claim 1, wherein the server further comprises a configuration Application Programming Interface (API), and wherein one or more of the components are each configured to send lookup requests for one or more of the other components to the configuration API, wherein the configuration API is configured to:
    look up a requested component; and
    provide the requested component to the requesting component.

14. The system as recited in claim 13, wherein the lookup requests are formatted in accordance with XPath.

15. The system as recited in claim 1, wherein the configuration information comprises a plurality of related elements, wherein the meta-information describes the elements and a relationship among the elements.

16. The system as recited in claim 1, wherein the system is an application server system, wherein the plurality of servers comprises one or more application servers, and wherein the one of the plurality of servers is an administration server for the application server system.

17. A server, comprising:
    a memory; and
    a generation mechanism configured to:
        generate in the memory an in-memory representation of configuration information from meta-information describing a persistent store of the configuration information, wherein the in-memory representation of the configuration information is formatted in accordance with an in-memory data format, and wherein the persistent store of the configuration information is formatted in accordance with a data storage format; and
        generate on the server a plurality of components from the meta-information describing the configuration information, wherein the plurality of components are configured to access the in-memory representation of the configuration information to perform server configuration tasks.

18. The server as recited in claim 17, further comprising a user interface configured to access the plurality of components to perform the server configuration tasks in response to user input, wherein the generation mechanism is further configured to generate the user interface from the meta-information describing the configuration information.

19. The server as recited in claim 17, further configured to provide an instance of the in-memory representation of the configuration information to each of one or more other servers, wherein each of the other servers are configured to access the server information from the provided instance of the in-memory representation of the configuration information.

20. The server as recited in claim 17, further configured to provide an instance of the in-memory representation of the configuration information and an instance of the plurality of components to each of one or more other servers, wherein each instance of the plurality of components is configured to access the corresponding instance of the in-memory representation of the configuration information to perform configuration tasks of the particular server.

21. The server as recited in claim 17, further comprising a configuration Application Programming Interface (API) configured to provide access to the persistent store for the plurality of components independent of a location and the data storage format of the persistent store.

22. The server as recited in claim 21, wherein the configuration API is further configured to provide access to the persistent store for the plurality of components in accordance with a different data storage format in response to a change of the data storage format of the persistent store to the different data storage format.

23. The server as recited in claim 17, wherein the plurality of components each comprise:
    one or more program methods each configured to perform business logic of the server; and
    one or more access methods for accessing the in-memory representation of the configuration information.

24. The server as recited in claim 17, wherein the configuration information comprises a plurality of elements, wherein, to generate in the memory an in-memory representation of configuration information from meta-information describing a persistent store of the configuration information, the generation mechanism is further configured to generate a plurality of configuration components comprising the in-memory representation of the configuration information, wherein each of the configuration components represents one element of the configuration information.

25. The server as recited in claim 24, wherein each of the configuration components comprises one or more access methods for accessing the element of the configuration information represented by the configuration component.

26. The server as recited in claim 24, wherein the plurality of configuration components are Java beans.

27. The server as recited in claim 17, wherein one or more of the plurality of components are management components each comprising one or more program methods configured to access the in-memory representation of the configuration information to perform a particular one of the server configuration tasks.

28. The server as recited in claim 17, wherein the management components are Java Management Extensions (JMX) MBeans.

29. The server as recited in claim 17, further comprising a configuration Application Programming Interface (API), wherein one or more of the components are each configured to send lookup requests for one or more of the other components to the configuration API, wherein the configuration API is configured to:
    look up a requested component; and
    provide the requested component to the requesting component.

30. The server as recited in claim 29, wherein the lookup requests are formatted in accordance with XPath.

31. The server as recited in claim 17, wherein the configuration information comprises a plurality of related elements, wherein the meta-information describes the elements and a relationship among the elements.

32. The server as recited in claim 17, wherein the server is an administration server for one or more application servers in an application server system.

33. A method, comprising:
generating on a server an in-memory representation of configuration information from meta-information describing a persistent store of the configuration information, wherein the in-memory representation of the configuration information is formatted in accordance with an in-memory data format, and wherein the persistent store of the configuration information is formatted in accordance with a data storage format; and
generating on the server a plurality of components from the meta-information describing the configuration information, wherein the plurality of components are configured to access the in-memory representation of the configuration information to perform server configuration tasks.

34. The method as recited in claim 33, further comprising:
generating a user interface from the meta-information describing the configuration information; and
the user interface accessing the plurality of components to perform the server configuration tasks in response to user input.

35. The method as recited in claim 33, further comprising generating an instance of the in-memory representation of the configuration information on each, of one or more other servers, wherein the other servers are each configured to access the server information from the generated instance of the in-memory representation of the configuration information.

36. The method as recited in claim 33, further comprising generating an instance of the in-memory representation of the configuration information and an instance of the plurality of components on each of one or more other servers, wherein each instance of the plurality of components is configured to access the corresponding instance of the in-memory representation of the configuration information to perform configuration tasks of the particular server.

37. The method as recited in claim 33, further comprising one or more of the plurality of components accessing the persistent store through a configuration Application Programming Interface (API), wherein said accessing is performed transparent to a location and the data storage format of the persistent store.

38. The method as recited in claim 37, further comprising:
changing the data storage format of the persistent store to a different data storage format; and
the one or more of the plurality of components accessing the persistent store through the configuration API in accordance with the different data storage format.

39. The method as recited in claim 33, wherein the plurality of components each comprise:
one or more program methods each configured to perform business logic of the server; and
one or more access methods for accessing the in-memory representation of the configuration information.

40. The method as recited in claim 33, wherein the configuration information comprises a plurality of elements, wherein said generating on a server an in-memory representation of configuration information from meta-information describing a persistent store of the configuration information comprises generating a plurality of configuration components comprising the in-memory representation of the configuration information, wherein each of the configuration components represents one element of the configuration information.

41. The method as recited in claim 40, wherein each of the configuration components comprises one or more access methods for accessing the element of the configuration information represented by the configuration component.

42. The method as recited in claim 40, wherein the plurality of configuration components are Java beans.

43. The method as recited in claim 33, wherein one or more of the plurality of components are management components each comprising one or more program methods each configured to access one or more of the configuration components to perform a particular one of the server configuration tasks.

44. The method as recited in claim 43, wherein the management components are Java Management Extensions (JMX) MBeans.

45. The method as recited in claim 33, further comprising:
one of the components sending a lookup request for another one of the components to a configuration Application Programming Interface (API);
the configuration API looking up the requested component; and
the configuration API providing the requested component to the requesting management component.

46. The method as recited in claim 45, wherein the lookup requests are formatted in accordance with XPath.

47. The method as recited in claim 33, wherein the configuration information comprises a plurality of related elements, wherein the meta-information describes the elements and a relationship among the elements.

48. The method as recited in claim 33, wherein the server is an administration server for one or more application servers in an application server system.

49. A computer accessible storage medium comprising program instructions configured to implement:
generating on a server an in-memory representation of configuration information from meta-information describing a persistent store of the configuration information, wherein the in-memory representation of the configuration information is formatted in accordance with an in-memory data format, and wherein the persistent store of the configuration information is formatted in accordance with a data storage format; and
generating on the server a plurality of components from the meta-information describing the configuration information, wherein the plurality of components are configured to access the in-memory representation of the configuration information to perform server configuration tasks.

50. The computer accessible storage medium as recited in claim 49, wherein the program instructions are further configured to implement:
generating a user interface from the meta-information describing the configuration information; and
the user interface accessing the plurality of components to perform the server configuration tasks in response to user input.

51. The computer accessible storage medium as recited in claim 49, wherein the program instructions are further configured to implement generating an instance of the in-memory representation of the configuration information on each of one or more other servers, wherein the other servers are each configured to access the server information from the generated instance of the in-memory representation of the configuration information.

52. The computer accessible storage medium as recited in claim 49, wherein the program instructions are further configured to implement generating an instance of the in-memory representation of the configuration information and an instance of the plurality of components on each of one or more other servers, wherein each instance of the plurality of components is configured to access the corresponding instance of the in-memory representation of the configuration information to perform configuration tasks of the particular server.

53. The computer accessible storage medium as recited in claim 49, wherein the program instructions are further configured to implement one or more of the plurality of components accessing the persistent store through a configuration Application Programming Interface (API), wherein said accessing is performed transparent to a location and the data storage format of the persistent store.

54. The computer accessible storage medium as recited in claim 53, wherein the program instructions are further configured to implement:
   changing the data storage format of the persistent store to a different data storage format; and
   the one or more of the plurality of components accessing the persistent store through the configuration API in accordance with the different data storage format.

55. The computer accessible storage medium as recited in claim 49, wherein the plurality of components each comprise:
   one or more program methods each configured to perform business logic of the server; and
   one or more access methods for accessing the in-memory representation of the configuration information.

56. The computer accessible storage medium as recited in claim 49, wherein the configuration information comprises a plurality of elements, wherein, in said generating on a server an in-memory representation of configuration information from meta-information describing a persistent store of the configuration information, the program instructions are further configured to implement generating a plurality of configuration components comprising the in-memory representation of the configuration information, wherein each of the configuration components represents one element of the configuration information.

57. The computer accessible storage medium as recited in claim 56, wherein each of the configuration components comprises one or more access methods for accessing the element of the configuration information represented by the configuration component.

58. The computer accessible storage medium as recited in claim 56, wherein the plurality of configuration components are Java beans.

59. The computer accessible storage medium as recited in claim 49, wherein one or more of the plurality of components are management components each comprising one or more program methods each configured to access one or more of the configuration components to perform a particular one of the server configuration tasks.

60. The computer accessible storage medium as recited in claim 59, wherein the management components are Java Management Extensions (JMX) MBeans.

61. The computer accessible storage medium as recited in claim 49, wherein the program instructions are further configured to implement:
   one of the components sending a lookup request for another one of the components to a configuration Application Programming Interface (API);
   the configuration API looking up the requested component; and
   the configuration API providing the requested component to the requesting management component.

62. The computer accessible storage medium as recited in claim 61, wherein the lookup requests are formatted in accordance with XPath.

63. The computer accessible storage medium as recited in claim 49, wherein the configuration information comprises a plurality of related elements, wherein the meta-information describes the elements and a relationship among the elements.

64. The computer accessible storage medium as recited in claim 49, wherein the server is an administration server for one or more application servers in an application server system.

* * * * *